United States Patent
Kang et al.

(10) Patent No.: US 8,842,167 B2
(45) Date of Patent: Sep. 23, 2014

(54) MOBILE TERMINAL AND CONTROLLING METHOD THEREOF

(75) Inventors: Kyunghee Kang, Gyeonggi-do (KR); Hakhae Kim, Gyeonggi-do (KR); Soojung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 13/227,396

(22) Filed: Sep. 7, 2011

(65) Prior Publication Data

US 2012/0056998 A1 Mar. 8, 2012

(30) Foreign Application Priority Data

Sep. 8, 2010 (KR) ........................ 10-2010-0087980

(51) Int. Cl.
| | |
|---|---|
| H04N 13/00 | (2006.01) |
| A61B 1/04 | (2006.01) |
| H04N 13/02 | (2006.01) |
| H04N 15/00 | (2006.01) |
| G06K 9/00 | (2006.01) |
| G06K 9/34 | (2006.01) |
| G06K 9/46 | (2006.01) |

(52) U.S. Cl.
CPC ....... *H04N 13/0022* (2013.01); *H04N 13/0033* (2013.01); *H04N 13/0018* (2013.01); *H04N 13/0239* (2013.01); *H04N 2213/002* (2013.01); *H04N 13/0271* (2013.01)
USPC ............. 348/47; 382/154; 382/173; 382/243; 348/42

(58) Field of Classification Search
None
See application file for complete search history.

(56) References Cited

U.S. PATENT DOCUMENTS

| | | | | |
|---|---|---|---|---|
| 6,460,127 | B1 * | 10/2002 | Akerib | ........................... 712/10 |
| 2004/0233275 | A1 | 11/2004 | Tomita | |
| 2004/0247176 | A1 * | 12/2004 | Aucsmith et al. | ............. 382/154 |
| 2005/0053276 | A1 * | 3/2005 | Curti et al. | .................... 382/154 |
| 2008/0094471 | A1 * | 4/2008 | Usami et al. | .................. 348/148 |
| 2008/0240549 | A1 | 10/2008 | Koo et al. | |
| 2010/0302355 | A1 * | 12/2010 | Tamaru | .......................... 348/59 |
| 2010/0328432 | A1 * | 12/2010 | Tanaka | ........................... 348/46 |

FOREIGN PATENT DOCUMENTS

| | | |
|---|---|---|
| CN | 101015220 A | 8/2007 |
| CN | 101322155 A | 12/2008 |
| CN | 101562754 A | 10/2009 |
| EP | 0641132 | 3/1995 |
| WO | 2008/139351 | 11/2008 |

OTHER PUBLICATIONS

Jan-Keno Janssen et al., "Krank durch 3D", C'T, vol. 2010, No. 11, May 2010, XP55036278.
The State Intellectual Property Office of the People's Republic of China Application Serial No. 201110272546.9, Office Action dated Mar. 5, 2014, 7 pages.

* cited by examiner

*Primary Examiner* — Joseph Ustaris
*Assistant Examiner* — Ellyar Y Barazesh
(74) *Attorney, Agent, or Firm* — Lee, Hong, Degerman, Kang & Waimey

(57) ABSTRACT

A mobile terminal and controlling method thereof are disclosed, by which a 3D or stereoscopic image can be generated to considerably relive an observer from visual fatigue. The present invention includes a first camera and a second camera configured to take a 3D image, a display unit displaying an image taken by at least one of the first and second cameras, and a controller controlling the first camera, the second camera and the display unit, wherein the controller sets a plurality of divisional sections on a left eye image taken by the first camera and a right eye image taken by the second camera and then generates the 3D image based on a depth value of each of a plurality of the divisional sections.

17 Claims, 21 Drawing Sheets

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2010-0087980, filed on Sep. 8, 2010, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for generating a 3D or stereoscopic image that considerably relives an observer from visual fatigue.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functions of the terminal tend to be diversified, the terminal is implemented as a multimedia player type equipped with composite functions including picture or video photographing, music or video file playback, games, broadcast reception and the like for example.

To support and increase of the terminal functions, it may be able to consider the improvement of structural parts and/or software parts of the terminal.

Recently, a portable camera capable of photographing of a 3D (or stereoscopic) image is developed. Considering such an ongoing tendency to develop the portable 3D camera, a mobile terminal is going to be equipped with a 3D image photographing camera and a processor for processing 3D images.

However, since a 3D image generated by a 3D image photographing camera and processor according to a related art causes a visual fatigue to an observer or viewer, the demand for a method of generating a 3D image to prevent the viewer's fatigue from viewing the 3D image is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a 3D image can be generated to prevent viewer's fatigue from viewing the 3D image.

Another object of the present invention is to provide a mobile terminal and controlling method thereof, by which a 3D image having optimal 3D effect can be generated in accordance with a 3D image mode.

A further object of the present invention is to provide a mobile terminal and controlling method thereof, by which a 3D image photographer is facilitated to photograph an optimal 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first camera and a second camera configured to take a 3D image, a display unit displaying an image taken by at least one of the first and second cameras, and a controller controlling the first camera, the second camera and the display unit. Moreover, the controller sets a plurality of divisional sections on a left eye image taken by the first camera and a right eye image taken by the second camera and then generates the 3D image based on a depth value of each of a plurality of the divisional sections.

In another aspect of the present invention, a method of controlling a mobile terminal includes an image taking step of photographing a left eye image and a right eye image of a subject using a first camera and a second camera, respectively, a divisional section setting step of arranging (or setting) a plurality of divisional sections on each of the left and right eye images of the subject obtained in the image taking step, a depth value determining step of determining a depth value of each of a plurality of the divisional sections, and a 3D image generating step of synthesizing and processing a 3D image, from which observer's visual fatigue can be eliminated in case of viewing, based on the depth value of each of a plurality of the divisional sections determined in the depth value determining step.

Accordingly, the present invention provides the following effects and/or advantages.

First of all, the present invention can generate a 3D image to prevent viewer's fatigue from viewing the 3D image.

Secondly, the present invention can generate a 3D image having optimal 3D effect in accordance with a 3D image mode.

Thirdly, the present invention facilitates a 3D image photographer to photograph an optimal 3D image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

A mobile terminal mentioned in the present specification can include one of a mobile phone, a smart phone, a notebook computer (laptop computer), a digital broadcast terminal, a PDA (personal digital assistants), a PMP (portable multimedia player), a navigation system and the like. And, it is apparent to those skilled in the art that the configuration according to an embodiment disclosed in this specification should be applicable to such a fixed or stationary terminal as a digital TV, a desktop computer and the like except a case applicable to a mobile terminal only.

Figure 1:
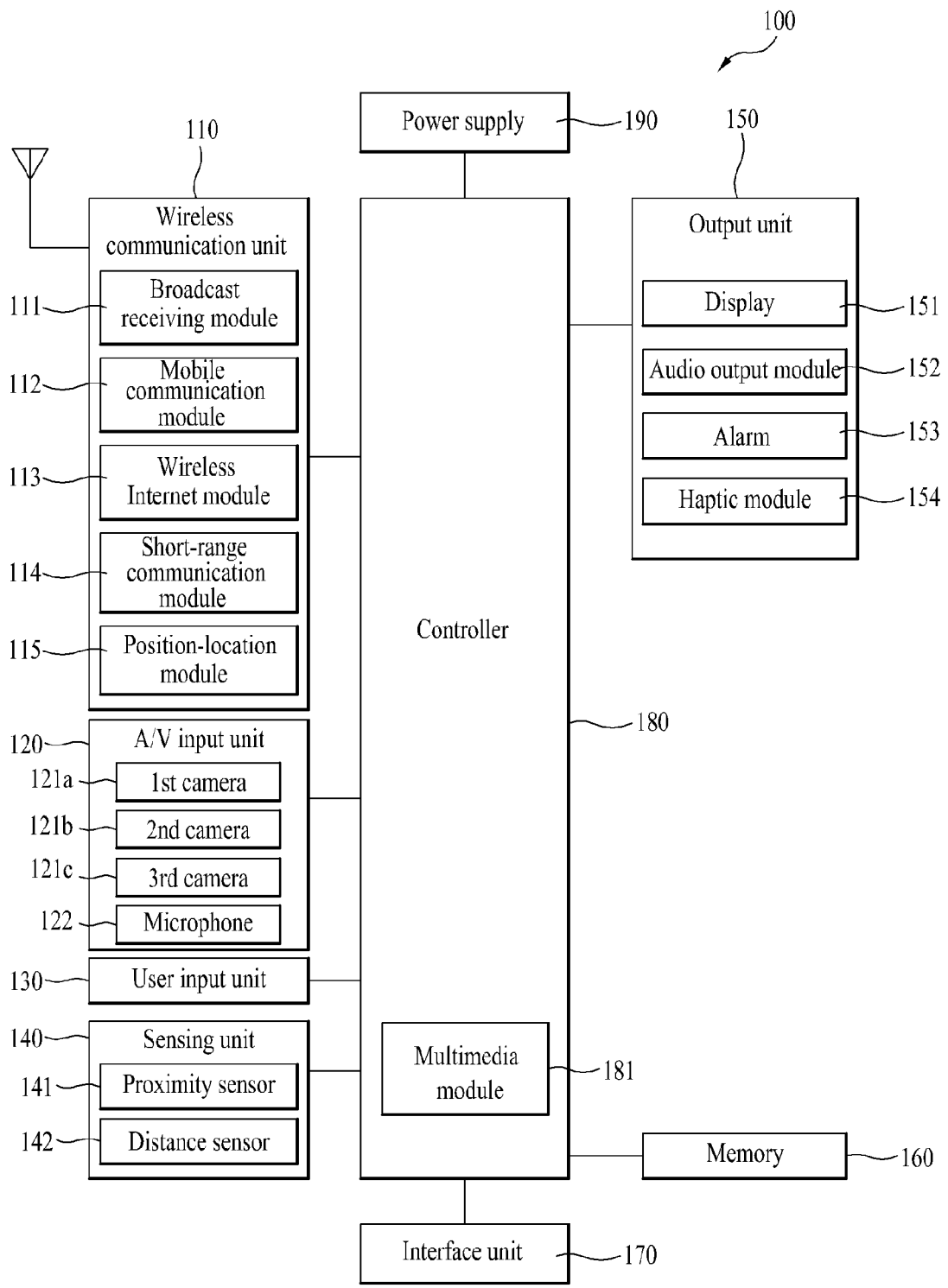
FIG. 1 is a block diagram of a mobile terminal in accordance with an embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above components are explained in turn.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

Moreover, a plurality of cameras 121 can be provided. In particular, a first camera 121a for taking a left eye image L of a 3D image 3D and a second camera 121b for taking a right eye image R of the 3D image 3D construct a binocular camera. And, a third camera 121c is a camera that works in a video call mode or a 2D photograph mode. Preferably, the first and second cameras 121a and 121b are able to take the 3D image 3D and are also operable in the video call mode or the 2D photograph mode.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

The sensing unit 140 detects such a current configuration of the mobile terminal 100 as an open/closed configuration of the mobile terminal 100, a location of the mobile terminal 100, a presence or non-presence of user contact, and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Meanwhile, the sensing unit 140 may include a proximity sensor 141.

The output unit 150 is configured to output an audio signal, a video signal and/or an alarm signal. And, the output unit 150 may include the display 151, an audio output module 152, an alarm output module 153, a haptic module 154, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. Owing to this structure, a user is able to see a thing situated in rear of the terminal body via the region occupied by the terminal body.

According to an implementation type of the mobile terminal 100, at least two displays 151 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively.

In case that the display 151 and a sensor for detecting a touch action (hereinafter called 'touch sensor') of such a pointer as a user's finger, a pen and the like configures a mutual layer structure (hereinafter called 'touchscreen'), it is able to use the display 151 as an input device as well as an output device. In this case, the touch sensor can be configured with a touch film, a touch sheet, a touchpad or the like for example.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 151 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen. Moreover, the memory 160 is able to store various kinds of control variables. In particular, the memory 160 is able to store length and space determined values of a light-cutoff part of a barrier layer corresponding to a distance between an observer and the display unit 151 as control variables of the barrier layer and is also able to store a displacement determined value corresponding to a deflecting angle formed by a position of a binocular center of the observer against a vertical center axis of the display unit 151.

The memory 160 may include at least one storage medium of such a type as a flash memory type, a hard disk type, a multimedia card micro type, a card type memory (e.g., SD memory, XD memory, etc.), RAM, SRAM (Static Random Access Memory), ROM, EEPROM (Electrically Erasable Programmable Read-Only Memory), PROM (Programmable Read-Only Memory) and the like. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touchscreen into a character and an image, respectively.

Moreover, in case that the binocular camera constructed with the first camera 121a and the second camera 121b takes a 3D image 3D, the controller 180 synthesizes and processes the 3D image 3D to generate a 3D image relieving the observer from visual fatigue. This shall be described in the following description.

The power supply 190 receives an external and/or internal power source and then supplies power required for operations of the respective components, under the control of the controller 180.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 2A:
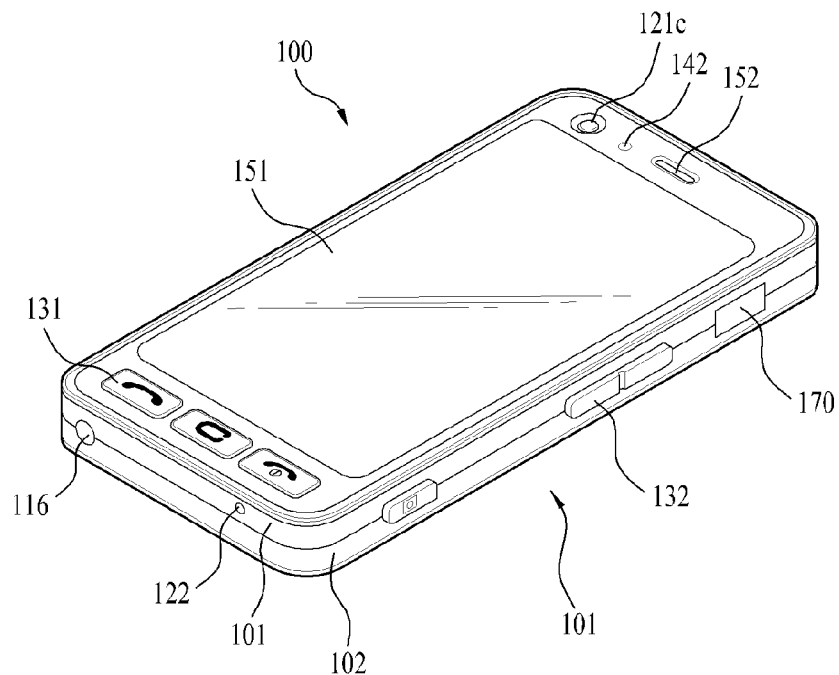
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include a folder type, a slide type, a rotational type, a swing type and combinations thereof. For clarity, further disclosure will primarily relate to a bar-type mobile terminal 100. However such teachings apply equally to other types of mobile terminals.

Referring to FIG. 2, a body of the mobile terminal 100 includes a case (e.g., a casing, a housing, a cover, etc.) configuring an exterior thereof. According to the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, a user input unit 130 (131/132), a microphone, an interface 170 and the like can be provided to the terminal body, and mainly, to the front case 101. In particular, the camera 121 includes the third camera 121c and is the camera that operates in a video call mode or a 2D photograph mode preferably.

The display 151 occupies most of a main face of the front case 101. The audio output unit 151 and the camera 121 are provided to an area adjacent to one of both end portions of the display 151, while the first user input unit 131 and the microphone 122 are provided to another area adjacent to the other end portion of the display 151. The second user input unit 132, the interface 170 and the like can be provided to lateral sides of the front and rear cases 101 and 102.

The user input unit 130 is manipulated to receive an input of a command for controlling an operation of the terminal 100. And, the input unit 130 is able to include a plurality of manipulating units 131 and 132. The manipulating units 131 and 132 can be generally named a manipulating portion and may adopt any mechanism of a tactile manner that enables a user to perform a manipulating action by experiencing a tactile feeling. Contents or substances inputted via the manipulating units 131 and 132 can be diversely set up. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
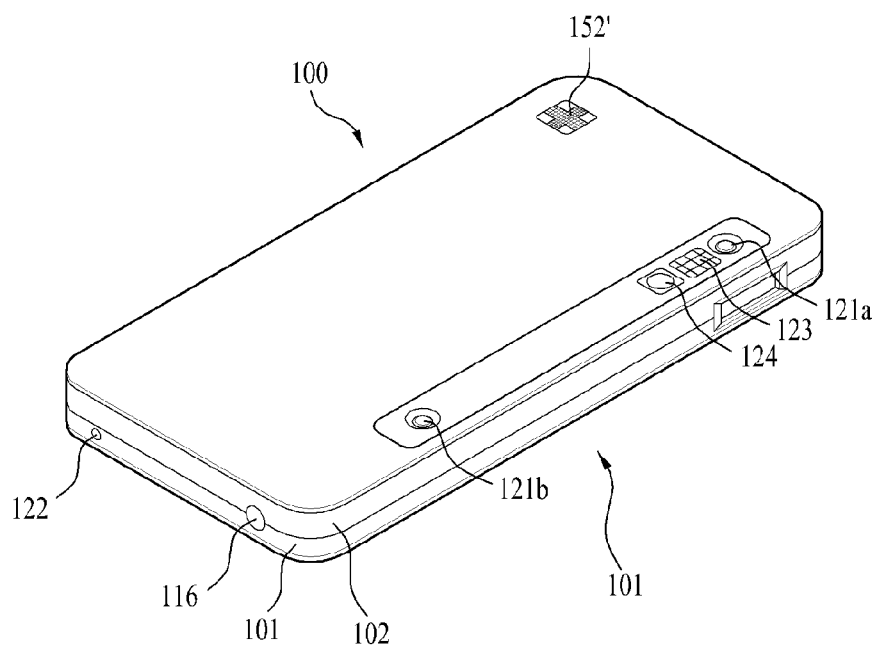
FIG. 2B is a rear perspective diagram of a mobile terminal according to one embodiment of the present invention.

FIG. 2B is a perspective diagram of a backside of the mobile terminal shown in FIG. 2A.

Referring to FIG. 2B, the binocular camera including the first camera 121a and the second camera 121b can be additionally loaded on a backside of the terminal body, and more particularly, on the rear case 102. Each of the first and second cameras 121a and 121b has a photographing direction that is substantially opposite to that of the third camera 121c shown in FIG. 2A. The first and second cameras 121a and 121b are able to take both a 3D image and a 2D image. Each of the first and second cameras 121a and 121b may have pixels differing from those of the third camera 121c.

Preferably, the third camera 121c has low pixels enough to take and transmit a picture of user's face for a video call for example. Preferably, since the first and second cameras 121a and 121b take 3D or 2D images of a general subject and the taken images are not usually transmitted instantly, each of the first and second cameras 121a and 121b has high pixels. And, each of the first to third cameras 121a to 121c can be installed at the terminal body to be rotatable or popped up.

A flash 123 and a mirror 124 are additionally provided in the vicinity of the first camera 121a. The flash 123 projects light toward a subject in case of photographing the subject using the first camera 121a. In case that a user attempts to take a picture of himself (self-photographing) using the first camera 121a, the mirror 124 enables the user to view his face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the mobile terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmitting type like the display 151. In this case, if the display 151 is configured to output visual information from its both faces, it is able to recognize the visual information via the touchpad 135 as well. The information outputted from both of the faces can be entirely controlled by the touchpad 135. Alternatively, another display is further provided to the touchpad 135 so that a touchscreen can be provided to the rear case 102 as well.

The touchpad 135 is activated by interconnecting with the display 151 of the front case 101. The touchpad 135 can be provided in front or rear of the display 151 in parallel. The touchpad 135 can have a size equal to or smaller than that of the display 151.

In the following description, a mobile terminal according to one embodiment of the present invention is explained. For clarity of the following description of a mobile terminal according to one embodiment of the present invention, assume that the mobile terminal mentioned in the following description includes at least one of the former components shown in FIG. 1. In particular, a mobile terminal, to which the present invention is applicable, includes the first and second cameras 121a and 121b required for taking a 3D image, the display unit 151 configured to output images, and a controller 180 configured to controlling the first camera 121a, the second camera 121b and the display unit 151.

The first camera 121a is a right eye camera for taking a left eye image L of a subject. The second camera 121b is a left eye camera for taking a right eye image R of the subject. When a user looks at a subject using a pair of eyes (i.e., both eyes), the user recognizes a 3D effect of the subject owing to binocular disparity attributed to a distance between both eyes. In order to form the binocular disparity that causes the 3D effect of the subject, the first and second cameras 121a and 121b are arranged in a manner of being spaced apart from each other by leaving a predetermined space in-between. Preferably, the space between the first and second cameras 121a and 121b is set to 6 cm~7 cm, which is similar to a distance between human eyes.

Figure 3:
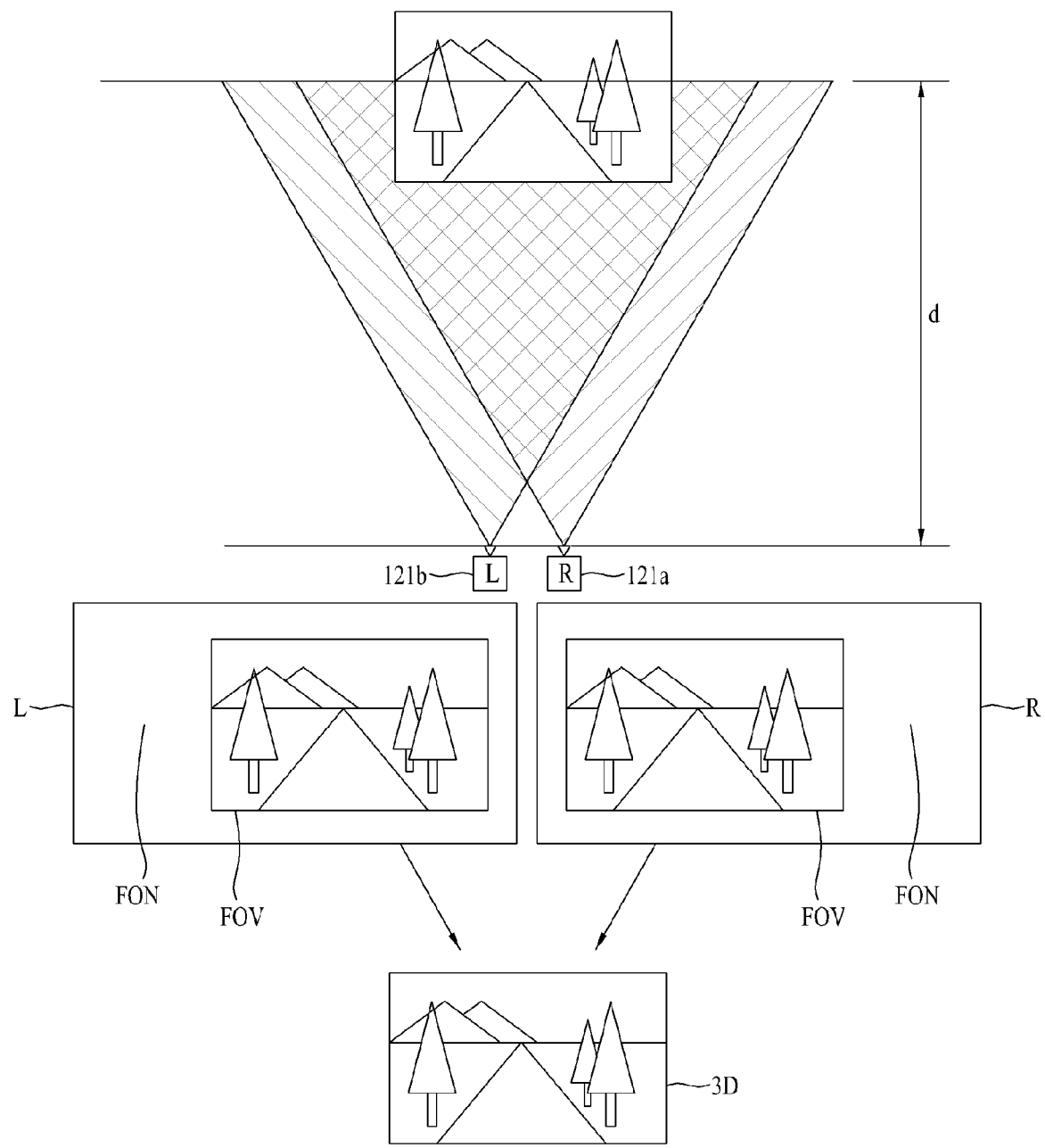
FIG. 3 is a schematic diagram for an image photographing process according to the present invention.

FIG. 3 is a schematic diagram for an image photographing process according to the present invention. In particular, FIG. 3 shows a left eye image L taken by the first camera 121a of the mobile terminal, a right eye image R taken by the second camera 121b of the mobile terminal and a 3D image taken by both of the first and second cameras 121a and 121b of the mobile terminal according to the present invention.

Referring to FIG. 3, the first camera 121a (i.e., the right eye camera) is able to take a right eye image R of a subject (e.g., a landscape in FIG. 3). And, the second camera 121b (i.e., the left eye camera) is able to take a left eye image L of the subject. Thereafter, the right eye image R and the left eye image L are transmitted to the controller 180 and are then generated into a 3D image through processing and synthesis. The generated 3D image is stored in the memory or can be displayed on the display unit 151.

Each of the right eye image R taken by the first camera 121a and the left eye image L taken by the second camera 121b includes an FOV (field of view) synthesized into the 3D image and an FON (field of non-view) removed in case of generating the 3D image.

In the following description, a 3D image causing visual fatigue to an observer, who is watching a corresponding image, and a 3D image causing no visual fatigue to the observer are explained. Subsequently, a process for the controller 180 to generate a 3D image, which provides an optimal 3D effect to an observer, according to the present invention is described. Generally, such a terminology as a depth is used to indicate a 3D effect or a perspective effect in generating or producing a 3D image. Yet, for clarity of the following description, a depth value (d) shall be consistently used.

Figure 4A:
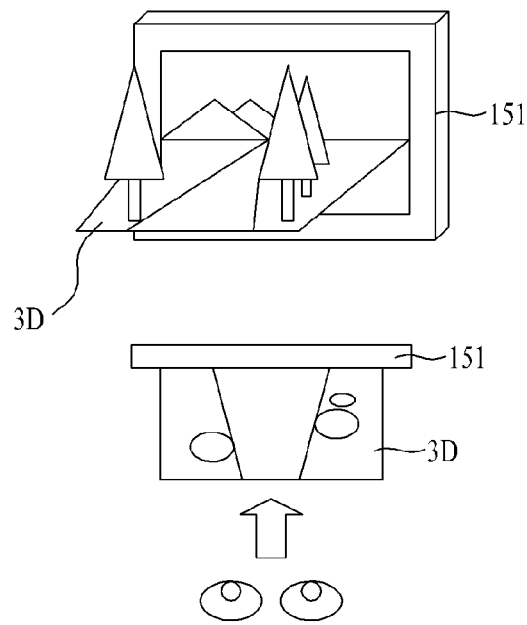
FIG. 4A and FIG. 4B are schematic diagrams for a 3D effect in a 3D image display in accordance with a convergence point of each 3D image.
Figure 4B:
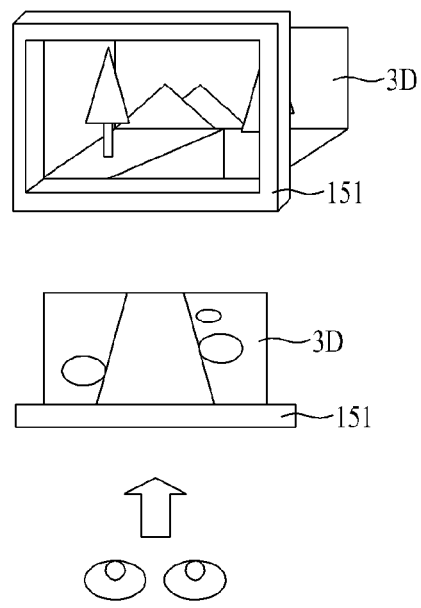

FIG. 4A and FIG. 4B are schematic diagrams for a 3D effect in a 3D image display in accordance with a convergence point of each 3D image. In particular, FIG. 4A is a schematic diagram of a 3D image causing visual fatigue to an observer in accordance with a convergence point set on a 3D image. And, FIG. 4B is a schematic diagram of a 3D image causing no visual fatigue to an observer in accordance with a convergence point set on a 3D image.

In this case, the convergence point indicates a specific point, at which parallax information of two cameras becomes zero due to a convergence between the first and second cameras 121a and 121b. In this case, the convergence means a phenomenon that the first and second cameras 121a and 121b are focused on a subject by moving toward each other in a manner similar to that of a phenomenon that both eyes of a person, who is looking at a specific subject, are focused on a subject by moving toward each other. A point/region designated (or set) to a convergence point becomes a point/region situated on a surface of the display unit 151 or the screen when a 3D image is watched. In particular, an observer recognizes a region designated to a convergence point as situated on a surface of the display unit 151 like 2D image. And, the region designated to the convergence point is generally called a stereowindow. In particular, when a 3D image is watched, an observer recognizes a unit subject, which is situated farther than another unit subject in a region designated to a convergence point in case of a 3D image photographing, as situated in rear of the display unit 151 (i.e., the surface of the display unit 151). On the contrary, when a 3D image is watched, an observer recognizes a unit subject, which is situated closer than another unit subject in a region designated to a convergence point in case of a 3D image photographing, as situated in front of the display unit 151 (i.e., the surface of the display unit 151).

Referring to FIG. 4A, a 3D image is taken by a binocular camera. In case of the 3D image of which convergence point is designated to a unit subject of a most remote distance (or an excessively remote distance) by the controller 180 (i.e., automatically) or a photographer (i.e., manually), when an observer watches the 3D image via the display unit 151, the observer recognizes most of the 3D image as situated by being projected from the surface of the display unit 151 (i.e., stereowindow). In this case, the observer experiences visual fatigue. When the observer watches the 3D image for a long time, the visual fatigue may cause blood-shot eyes, dizziness, vomiting, nausea and the like to the observer.

Referring to FIG. 4B, a 3D image is taken by a binocular camera. In case of the 3D image of which convergence point is designated to a unit subject of a nearest distance by the controller 180 (i.e., automatically) or a photographer (i.e., manually), when an observer watches the 3D image via the display unit 151, the observer recognizes most of the 3D image as situated by being receding from the surface of the display unit 151 (i.e., stereowindow). In this case, since the observer barely experiences visual fatigue, no pain due to the visual fatigue is caused to the observer. Yet, since the observer senses that subjects are situated remote, reality of the 3D image is reduced more or less.

As mentioned in the foregoing description, in order to prevent observer's visual fatigue and to enhance reality of 3D image, a convergence point is optimally designated to a region of the 3D image. In the following description, a mobile terminal generating a 3D image having an optimally designated convergence point and controlling method thereof according to the present invention are explained in detail.

Figure 5:
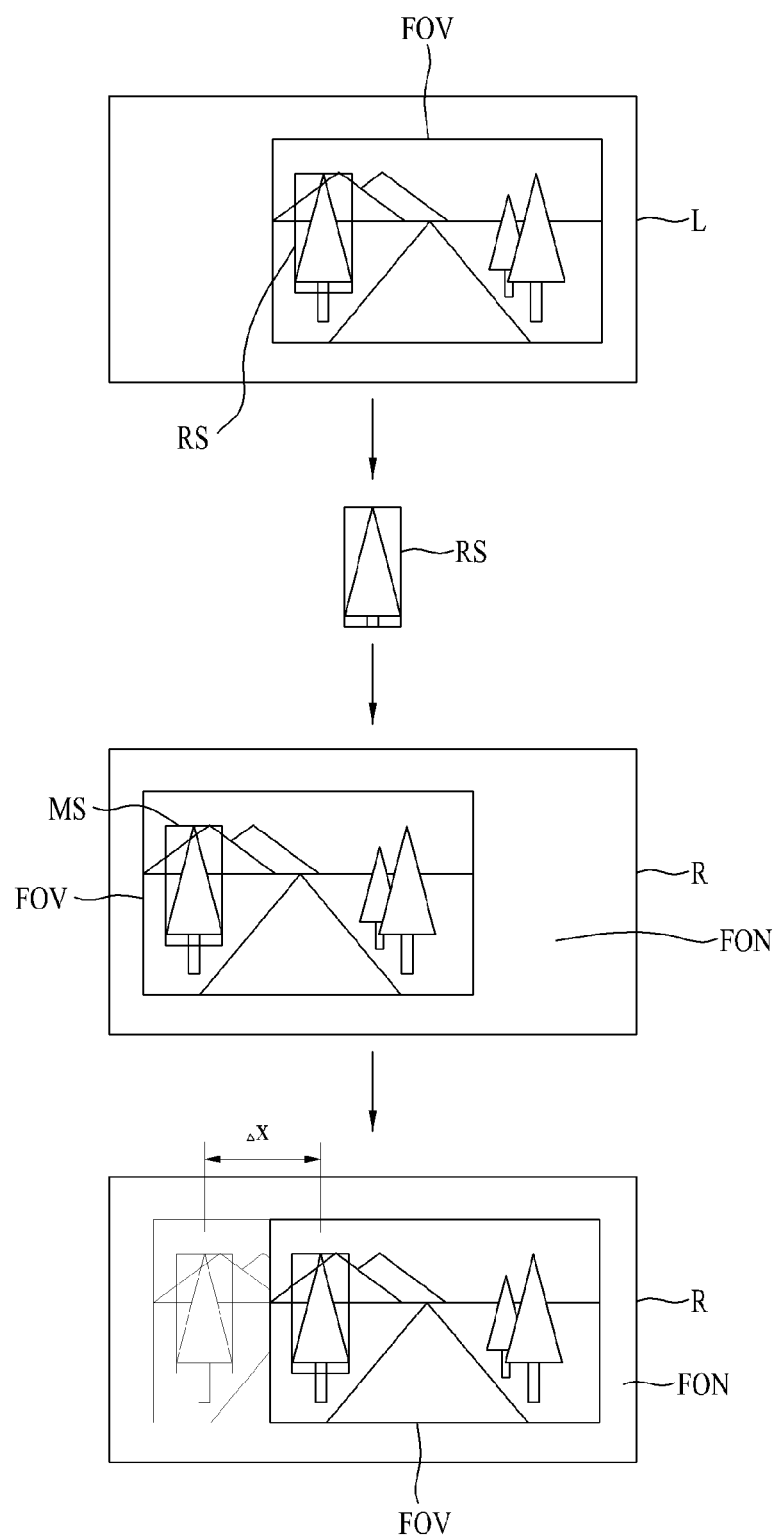
FIG. 5 is a schematic diagram for a depth value determining step according to one embodiment of the present invention.

FIG. 5 is a schematic diagram for a depth value determining step according to one embodiment of the present invention. In particular, since depth values of unit subjects contained in a generated 3D image need to be determined to designate an optimal convergence point in the 3D image, FIG. 5 schematically shows sub-steps of a depth value determining step.

Referring to FIG. 5, the controller 180 is able to set a reference section (hereinafter abbreviated RS) to a specific section in one of left and right eye images L and R. In FIG. 5, the controller 180 sets the reference section RS to a specific section of the left eye image L for example. The controller 180 extracts the reference section RS and is then able to search the right eye image R for a matching section (hereinafter abbreviated MS) including an FOV (field of view) (or, one of a unit subject and a portion of the unit subject) corresponding to (or matching almost) an FOV (or, one of a unit subject and a portion of the unit subject) included in the reference section RS.

Subsequently, the controller 180 shifts the FOV included in the matching section MS of the right eye image R to the right by a prescribed displacement ΔX within the right eye image R to enable a position of the reference section RS of the left image L to match a position of the matching section MS of the right eye image R and is then able to calculate the prescribed displacement ΔX.

Figure 6:
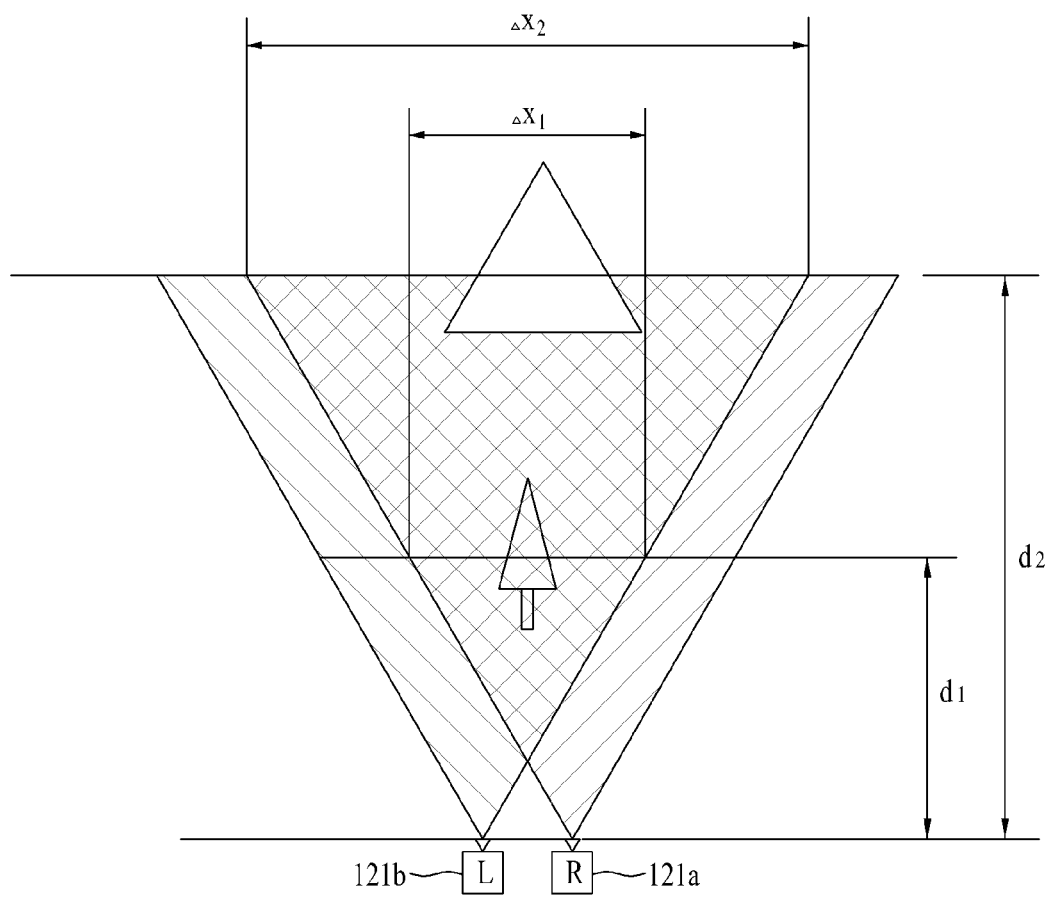
FIG. 6 is a schematic diagram for a depth value calculating process according to one embodiment of the present invention.

FIG. 6 is a schematic diagram for a depth value calculating process according to one embodiment of the present invention. In particular, FIG. 6 schematically shoes a depth value calculating process for calculating a depth value d of a reference section RS based on the prescribed displacement ΔX calculated in the former process shown in FIG. 5.

Referring to FIG. 6, the controller 180 calculates a first depth value $d_1$, which is a depth value of a unit subject, based on a first displacement $\Delta X_1$ amounting to a displacement of the unit subject (e.g., a tree in FIG. 6) situated in a close distance using a proportional relation between a displacement and a depth value. And, the controller 180 is able to calculate a second depth value $d_2$, which is a depth value of a unit subject, based on a second displacement $\Delta X_2$ amounting to a displacement of the unit subject (e.g., a mountain in FIG. 6) situated in a remote distance.

The depth value calculating process or the displacement calculating process is exemplary, by which the present invention is non-limited. And, any technique of calculating a depth value of a subject in a 3D image is applicable to the present invention.

Figure 7:
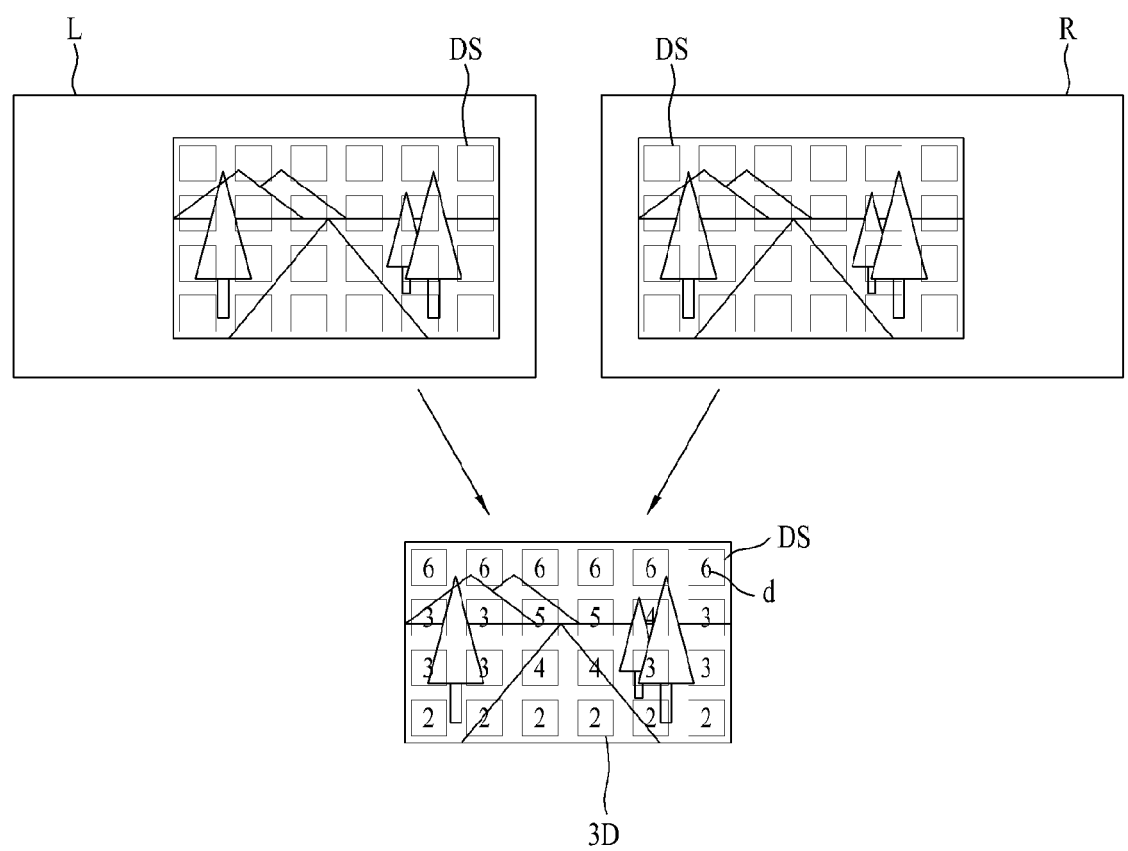
FIG. 7 is a schematic diagram for a divisional section setting step and a depth value determining step according to one embodiment of the present invention.

FIG. 7 is a schematic diagram for a divisional section setting step and a depth value determining step according to one embodiment of the present invention.

First of all, FIG. 5 and FIG. 6 show a process for determining a depth value in a manner of setting a single section to a reference section RS and/or a matching section MS. Yet, referring to FIG. 7, the controller 180 of the present invention sets or arranges a plurality of divisional sections (hereinafter abbreviated DSs) on left and right eye images L and R and is then able to determine a depth value d of each of a plurality of the divisional sections DS.

In particular, the controller 180 is able to determine the depth value d of each of a plurality of the divisional sections DS in a manner of repeating the depth value determining step shown in FIG. 5 and FIG. 6 as many as the amount of a plurality of the divisional sections DS set on the left and right eye images L and R. In the following description, for clarity, when a 3D image is taken, a unit subject or a portion of the unit subject situated in a nearer distance shall be indicated as a smaller number, while a unit subject or a portion of the unit subject situated in a farther distance shall be indicated as a bigger number.

According to one embodiment of the present invention, the controller 180 is able to set divisional sections DS of left and right eye images L and R in a manner that a plurality of the divisional sections DS are equal to each other in size.

Thus, as the controller 180 determines depth a value each of a plurality of the divisional sections DS set on the left and right eye images L and R, a convergence point, which provides an optimal 3D effect without providing visual fatigue to an observer in watching a 3D image, can be precisely designated in the 3D image. Therefore, the observer can be provided with an optimal 3D image.

Figure 8:
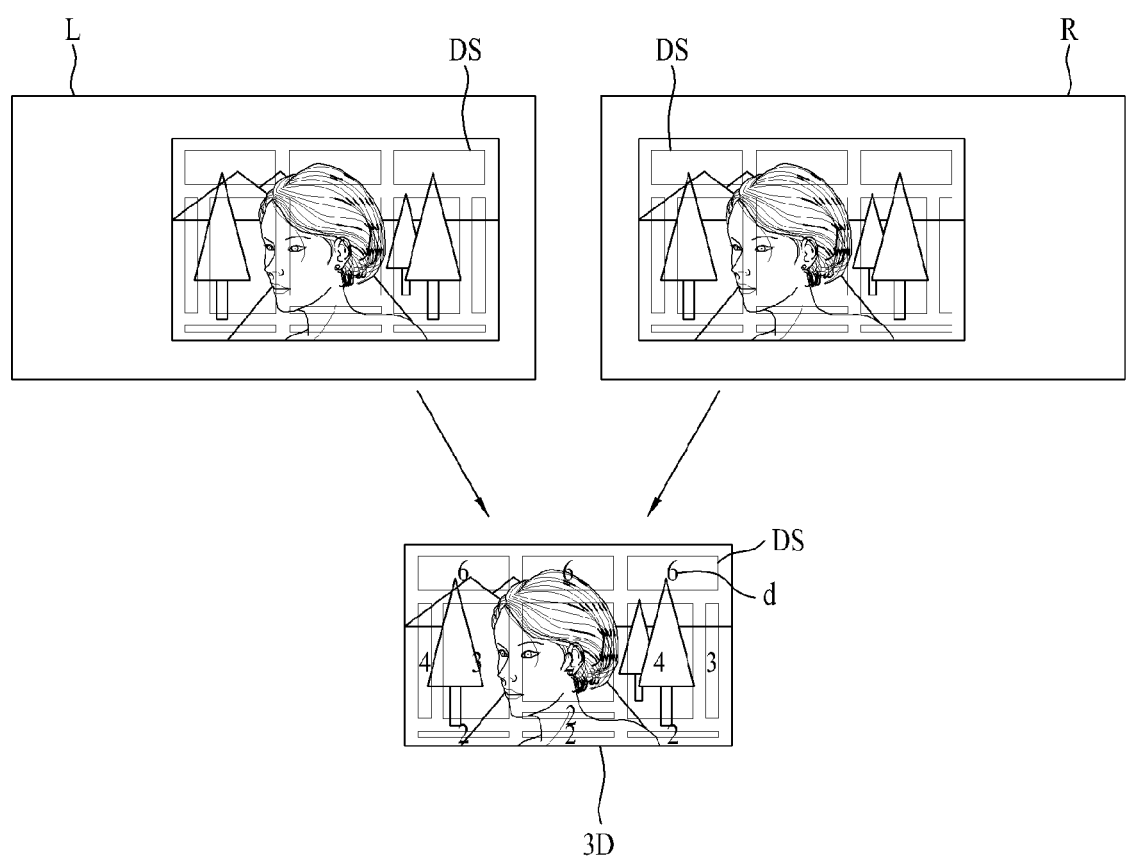
FIG. 8 is a schematic diagram for a divisional section setting step and a depth value determining step according to another embodiment of the present invention.

FIG. 8 is a schematic diagram for a divisional section setting step and a depth value determining step according to another embodiment of the present invention.

First of all, FIG. 5 and FIG. 6 show a process for determining a depth value in a manner of setting a single section to a reference section RS and/or a matching section MS. Yet, referring to FIG. 8, the controller 180 of the present invention sets or arranges a plurality of divisional sections (hereinafter abbreviated DSs) on left and right eye images L and R and is then able to determine a depth value d of each of a plurality of the divisional sections DS.

In particular, the controller 180 is able to determine the depth value d of each of a plurality of the divisional sections DS in a manner of repeating the depth value determining step shown in FIG. 5 and FIG. 6 as many as the amount of a plurality of the divisional sections DS set on the left and right eye images L and R.

According to another embodiment of the present invention, the controller 180 is able to set divisional sections DS of left and right eye images L and R in a manner that some of a plurality of divisional sections DS differ from each other in size. In this case, preferably, the controller 180 is able to control the setting of a plurality of the divisional sections DSs in a manner that a plurality of the divisional sections DSs differ from each other in size with reference to unit subjects included in the left and right eye images L and R.

Thus, as the controller 180 determines depth a value each of a plurality of the divisional sections DS set on the left and right eye images L and R, a convergence point, which provides an optimal 3D effect without providing visual fatigue to an observer in watching a 3D image, can be precisely designated in the 3D image. Therefore, the observer can be provided with a different 3D effect per unit subject, thereby being provided with a 3D image having a more realistic 3D effect.

Before designating a convergence point in a 3D image, as mentioned in the above description, the controller 180 of the present invention is able to designate the convergence point fit for a type of a subject in a manner of determining whether a subject taken in the 3D image including a left eye image L and a right eye image R is a simple landscape, whether an object exists in a landscape to become a target of a focus, whether an object exists in a room to become a target of a focus, and whether an object is a closeup photographing object. In particular, the controller 180 classifies a type of a subject taken by the first and second cameras 121a and 121b with reference to a preset 3D image mode and is then able to designate a convergence point to a region optimal to the 3D image mode (i.e., a plurality of divisional sections DSs set on the left and right eye images L and R).

A 3D image mode preset in the memory of the mobile terminal includes one of a landscape mode, a focal object mode within a landscape, an indoor focal object mode, and a closeup photographing mode. And, each of a landscape mode, a focal object mode within a landscape, an indoor focal object mode, and a closeup photographing mode has a unique distribution of preset depth values.

In the following description, a preset depth value distribution according to each 3D image mode, a 3D image stored in a memory by designating a convergence point suitable for each 3D image mode, and a schematic layout of the 3D image displayed on the display unit 151 are explained with reference to FIGS. 9 to 12.

Figure 9A:
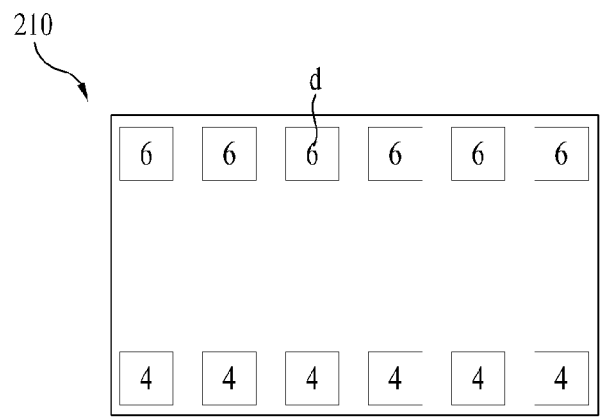
FIG. 9A is a schematic diagram of preset depth value distribution in a landscape mode belonging to a 3D image mode according to the present invention.
Figure 9B:
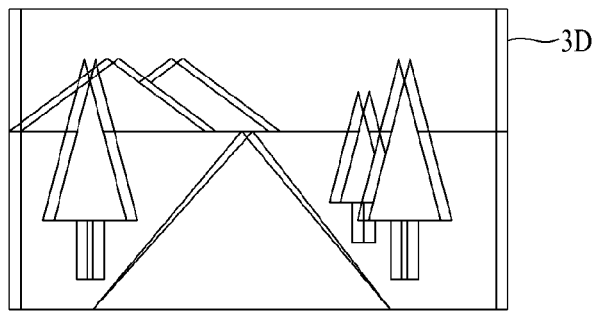
FIG. 9B is a schematic diagram of a 3D image stored in a memory in a landscape mode belonging to a 3D image mode according to the present invention.
Figure 9C:
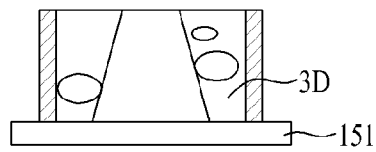
FIG. 9C is a schematic layout of a 3D image in a landscape mode belonging to a 3D image mode in case of displaying the 3D image on a display unit according to the present invention.
Figure 9C:
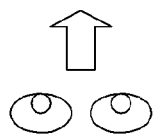

FIG. 9A is a schematic diagram of preset depth value distribution in a landscape mode belonging to a 3D image mode according to the present invention. FIG. 9B is a schematic diagram of a 3D image stored in a memory in a landscape mode belonging to a 3D image mode according to the present invention. And, FIG. 9C is a schematic layout of a 3D image in a landscape mode belonging to a 3D image mode in case of displaying the 3D image on a display unit according to the present invention. The drawings show the exemplary depth value distribution only to clearly describe the present invention, by which the present invention is non-limited.

Referring to FIG. 9A, a preset depth value distribution of a landscape mode belonging to a 3D image mode preset in the memory is configured in a following manner. First of all, a plurality of depth values (e.g., represented as '6' in FIG. 9) indicating a remote distance are arranged on a top side of a 3D image frame. Secondly, a plurality of depth values (e.g., represented as '4' in FIG. 9) indicating a middle distance are arranged on a bottom side of the 3D image frame.

The controller 180 compares a depth value distribution of a plurality of divisional sections DSs set on left and right eye images L and R to a preset depth value distribution of a 3D image frame in a landscape mode shown in FIG. 9A. If the depth value distribution of a plurality of the divisional sections DSs matches (or almost matches) the preset depth value distribution of the landscape mode, the controller 180 is able to determine a 3D image mode of a subject taken in each of the left and right eye images L and R as the landscape mode.

Referring to FIG. 9B, if the controller 180 determines the 3D image mode of the taken subject in each of the left and right eye images L and R as the landscape mode, the controller 180 designates the divisional sections DSs having the depth value indicating a nearest distance among a plurality of the divisional sections DSs set on the left and right eye images L and R as a convergence point and is then able to generate a 3D image by overlapping the divisional sections DSs of the left and right eye images L and R, which are designated to the convergence point, with each other.

For instance, referring to FIG. 9B, in case that the taken subject in the left and right eye images L and R is a landscape, the controller 180 designates the divisional sections DSs set on 'entrance part of road' situated nearest to the left and right eye cameras (i.e., having a smallest depth value) to a convergence point and is then able to generate a 3D image by of stacking the whole left eye image L and the whole right eye image R on each other in a manner that the divisional sections DSs set on the 'entrance part of road' are overlapped with each other.

In case that the divisional sections DSs having the depth values indicating the remote distance and the middle distance in the left and right eye images L and are designated to a convergence point, an observer recognizes that almost all unit subjects within a subject are projected from a surface of the display unit 151 (i.e., stereowindow) in case of watching a 3D image. Therefore, 3D reality of the 3D image is reduced. Moreover, the unit subjects, which are recognized by the observer as excessively projected, may look wavering to cause visual fatigue to the observer. Therefore, in case of the landscape mode, the divisional sections DSs set on the unit subject situated in the nearest distance are designated to the convergence point.

Referring to FIG. 9C, when the 3D image generated in the landscape mode shown in FIG. 9B is displayed on the display unit 151, the 'entrance part of road' set as the convergence point of the 3D image is displayed on the surface of the display unit 151 (i.e., stereowindow), while the rest of the unit subjects taken in the 3D image are displayed in a manner that the observer recognizes that all of the rest of the unit subjects recede in rear of the surface of the display unit 151.

Therefore, in case that a subject is a landscape, the controller 180 sets the convergence point as mentioned in the foregoing description. Therefore, the realistic 3D effect of the 3D image is enhanced and the 3D image is also prevented from causing visual fatigue to an observer.

Figure 10A:
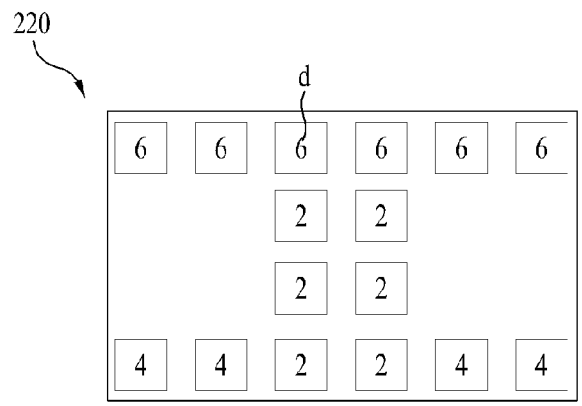
FIG. 10A is a schematic diagram of preset depth value distribution in an intra-landscape focal object mode belonging to a 3D image mode according to the present invention.
Figure 10B:
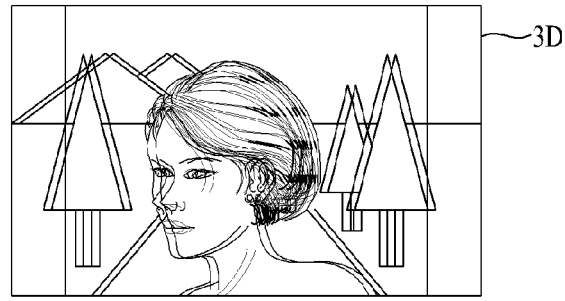
FIG. 10B is a schematic diagram of a 3D image stored in a memory in an intra-landscape focal object mode belonging to a 3D image mode according to the present invention.
Figure 10C:
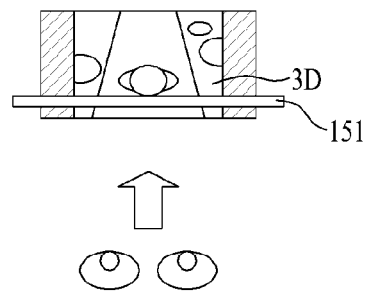
FIG. 10C is a schematic layout of a 3D image in an intra-landscape focal object mode belonging to a 3D image mode in case of displaying the 3D image on a display unit according to the present invention.

FIG. 10A is a schematic diagram of preset depth value distribution in an intra-landscape focal object mode belonging to a 3D image mode according to the present invention. FIG. 10B is a schematic diagram of a 3D image stored in a memory in an intra-landscape focal object mode belonging to a 3D image mode according to the present invention. And, FIG. 10C is a schematic layout of a 3D image in an intra-landscape focal object mode belonging to a 3D image mode in case of displaying the 3D image on a display unit according to the present invention.

Referring to FIG. 10A, a preset depth value distribution of an intra-landscape focal object mode belonging to a 3D image mode preset in the memory is configured in a following manner. First of all, a plurality of depth values (e.g., a depth value represented as '6' in FIG. 10A) indicating a remote distance are arranged on a top side of a 3D image frame. Secondly, a plurality of depth values (e.g., a depth value represented as '2' in FIG. 10A) indicating a near distance are arranged on at least one of middle and bottom sides of the 3D image frame. Thirdly, a plurality of depth values (e.g., a depth value represented as '4' in FIG. 10A) indicating a middle distance are arranged on at least one part of the bottom side of the 3D image frame.

The controller 180 compares a depth value distribution of a plurality of divisional sections DSs set on left and right eye images L and R to a preset depth value distribution of a 3D image frame in an intra-landscape focal object mode shown in FIG. 10A. If the depth value distribution of a plurality of the divisional sections DSs matches (or almost matches) the preset depth value distribution of the intra-landscape focal object mode, the controller 180 is able to determine a 3D image mode of a subject taken in each of the left and right eye images L and R as the intra-landscape focal object mode.

Referring to FIG. 10B, if the controller 180 determines the 3D image mode of the taken subject in each of the left and right eye images L and R as the intra-landscape focal object mode, the controller 180 designates the divisional sections DSs corresponding to an average depth value of the divisional sections DSs having the depth value indicating a nearest distance and the divisional sections DSs having a depth value of a focal object among a plurality of the divisional sections DSs set on the left and right eye images L and R as a convergence point and is then able to generate a 3D image by overlapping the divisional sections DSs of the left and right eye images L and R, which are designated to the convergence point, with each other.

For instance, referring to FIG. 10B, in case that the taken subject in the left and right eye images L and R is a person (i.e., a focal object) in a landscape, the controller 180 designates the divisional section DS corresponding to 'front part of left tree' having an average depth value of the depth value of the divisional sections DSs set on 'entrance part of road' situated nearest to the left and right eye cameras (i.e., having a smallest depth value) and the divisional sections DSs corresponding to the person to a convergence point and is then able to generate a 3D image by stacking the whole left eye image L and the whole right eye image R on each other in a manner that the divisional sections DSs set on the 'front part of left tree' are overlapped with each other.

In case that divisional sections DSs corresponding to a person (i.e., a focal object) are designated to a convergence point, a remote space sense of a 3D image is reduced. Moreover, since an observer recognizes that unit subjects situated neat the person are projected from a surface of the display unit 151 (i.e., stereowindow) in case of watching a 3D image, 3D reality of the 3D image is reduced. Therefore, in case of an intra-landscape focal object mode, divisional sections DS having an average depth value of a depth value of a focal object and a depth value indicating a nearest distance is designated to a convergence point.

Referring to FIG. 10C, when the 3D image generated in the landscape mode shown in FIG. 10B is displayed on the display unit 151, the 'front part of left tree' set as the convergence point of the 3D image is displayed on the surface of the display unit 151 (i.e., stereowindow), the person of the focal object is displayed in a manner of being projected from the surface of the display unit 151, the rest of the unit subjects taken in the 3D image are displayed in a manner that the observer recognizes that the rest of the unit subjects recede in rear of the surface of the display unit 151.

Thus, in case that a subject is in an intra-landscape focal object mode, the controller 180 sets the convergence point as mentioned in the foregoing description. Therefore, the realistic 3D effect of the 3D image is enhanced and the 3D image is also prevented from causing visual fatigue to an observer.

Figure 11A:
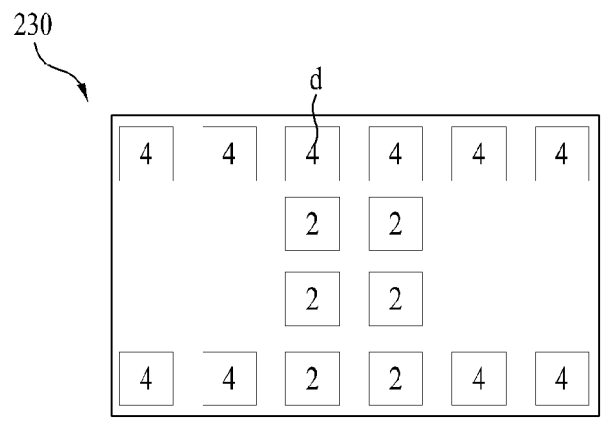
FIG. 11A is a schematic diagram of preset depth value distribution in an indoor focal object mode belonging to a 3D image mode according to the present invention.
Figure 11B:
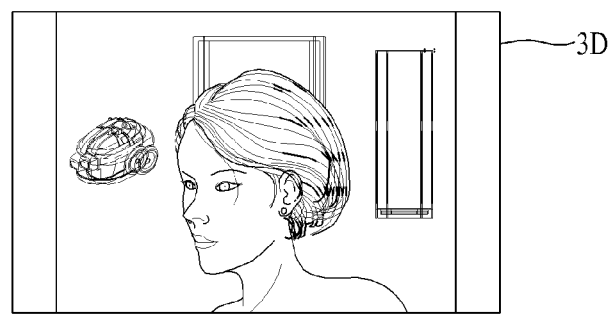
FIG. 11B is a schematic diagram of a 3D image stored in a memory in an indoor focal object mode belonging to a 3D image mode according to the present invention.
Figure 11C:
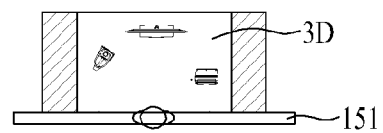
FIG. 11C is a schematic layout of a 3D image in an indoor focal object mode belonging to a 3D image mode in case of displaying the 3D image on a display unit according to the present invention.
Figure 11C:
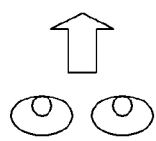

FIG. 11A is a schematic diagram of preset depth value distribution in an indoor focal object mode belonging to a 3D image mode according to the present invention. FIG. 11B is a schematic diagram of a 3D image stored in a memory in an indoor focal object mode belonging to a 3D image mode according to the present invention. And, FIG. 11C is a schematic layout of a 3D image in an indoor focal object mode belonging to a 3D image mode in case of displaying the 3D image on a display unit according to the present invention.

Referring to FIG. 11A, a preset depth value distribution of an indoor focal object mode belonging to a 3D image mode preset in the memory is configured in a following manner. First of all, a plurality of depth values (e.g., a depth value represented as '4' in FIG. 11A) indicating a middle distance are arranged on a top side of a 3D image frame. Secondly, a plurality of depth values (e.g., a depth value represented as '2' in FIG. 11A) indicating a near distance are arranged on at least one of middle and bottom sides of the 3D image frame. Thirdly, a plurality of depth values (e.g., a depth value represented as '4' in FIG. 11A) indicating the middle distance are arranged on at least one part of the bottom side of the 3D image frame.

The controller 180 compares a depth value distribution of a plurality of divisional sections DSs set on left and right eye images L and R to a preset depth value distribution of a 3D image frame in an indoor focal object mode shown in FIG. 11A. If the depth value distribution of a plurality of the divisional sections DSs matches (or almost matches) the preset depth value distribution of the indoor focal object mode, the controller 180 is able to determine a 3D image mode of a subject taken in each of the left and right eye images L and R as the indoor focal object mode.

Referring to FIG. 11B, if the controller 180 determines the 3D image mode of the taken subject in each of the left and right eye images L and R as the indoor focal object mode, the controller 180 designates the divisional sections DSs having a depth value of a focal object among a plurality of the divisional sections DSs set on the left and right eye images L and R as a convergence point and is then able to generate a 3D image by overlapping the divisional sections DSs of the left and right eye images L and R, which are designated to the convergence point, with each other.

For instance, referring to FIG. 11B, in case that the taken subject in the left and right eye images L and R is a person situated at an indoor space (or a room), the controller 180 designates the divisional section DS corresponding to 'person' to a convergence point and is then able to generate a 3D image by stacking the whole left eye image L and the whole right eye image R on each other in a manner that the divisional sections DSs set on the 'person' are overlapped with each other.

Since a depth value is limited to a predetermined value in case of the indoor space, it is preferable that the divisional sections DSs corresponding to the focal object are designated to the convergence point in aspect of the realistic 3D effect and the prevention of the visual fatigue generation.

Referring to FIG. 11C, when the 3D image generated in the indoor focal object mode shown in FIG. 11B is displayed on the display unit 151, the 'person' set as the convergence point of the 3D image is displayed on the surface of the display unit 151 (i.e., stereowindow), an observer recognizes that a unit subject situated nearer than the 'person' among the rest of unit subjects taken in the 3D image 3D is displayed by being projected in front of the surface of the display unit 151, and the observer recognizes that a unit subject situated farther than the 'person' among the rest of unit subjects taken in the 3D image 3D is displayed by being receding in rear of the surface of the display unit 151.

Thus, in case that a subject is a focal object situated in an indoor space, the controller 180 sets a convergence point as mentioned in the foregoing description. Therefore, the realistic 3D effect of the 3D image is enhanced and the 3D image is also prevented from causing visual fatigue to an observer.

Figure 12A:
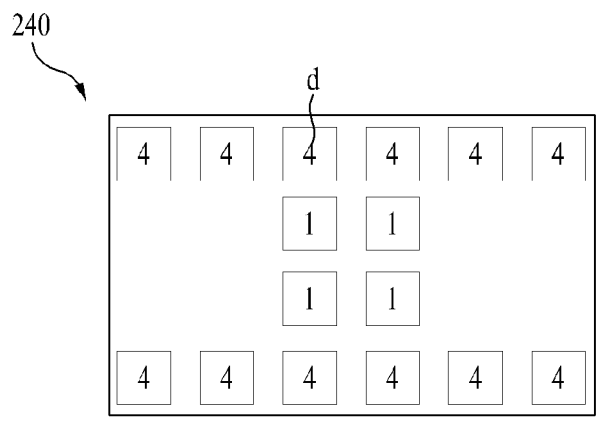
FIG. 12A is a schematic diagram of preset depth value distribution in a closeup mode belonging to a 3D image mode according to the present invention.
Figure 12B:
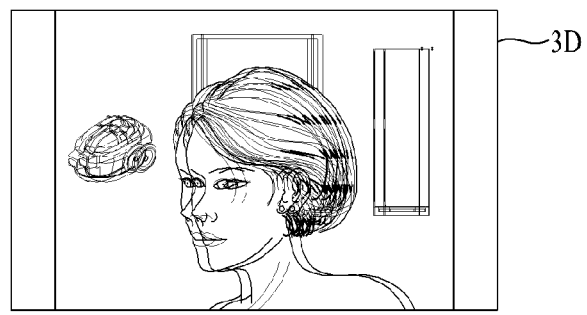
FIG. 12B is a schematic diagram of a 3D image stored in a memory in a closeup mode belonging to a 3D image mode according to the present invention.
Figure 12C:
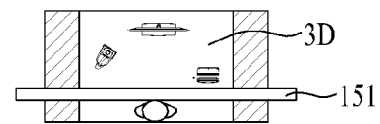
FIG. 12C is a schematic layout of a 3D image in a closeup mode belonging to a 3D image mode in case of displaying the 3D image on a display unit according to the present invention.
Figure 12C:
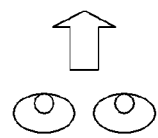

FIG. 12A is a schematic diagram of preset depth value distribution in a closeup mode belonging to a 3D image mode according to the present invention, FIG. 12B is a schematic diagram of a 3D image stored in a memory in a closeup mode belonging to a 3D image mode according to the present invention, and FIG. 12C is a schematic layout of a 3D image in a closeup mode belonging to a 3D image mode in case of displaying the 3D image on a display unit according to the present invention.

Referring to FIG. 12A, a preset depth value distribution of a closeup photographing mode belonging to a 3D image mode preset in the memory is configured in a following manner. First of all, a plurality of depth values (e.g., a depth value represented as '4' in FIG. 12A) indicating a middle distance are arranged on a top side of a 3D image frame. Secondly, a plurality of depth values (e.g., a depth value represented as '1' in FIG. 12A) indicating a closeup photographing distance are arranged on at least one of middle and bottom sides of the 3D image frame. Thirdly, a plurality of depth values (e.g., a depth value represented as '4' in FIG. 12A) indicating the middle distance are arranged on at least one part of the bottom side of the 3D image frame.

The controller 180 compares a depth value distribution of a plurality of divisional sections DSs set on left and right eye images L and R to a preset depth value distribution of a 3D image frame in an closeup photographing mode shown in FIG. 12A. If the depth value distribution of a plurality of the divisional sections DSs matches (or almost matches) the preset depth value distribution of the closeup photographing mode, the controller 180 is able to determine a 3D image mode of a subject taken in each of the left and right eye images L and R as the closeup photographing mode.

Referring to FIG. 12B, if the controller 180 determines the 3D image mode of the taken subject in each of the left and right eye images L and R as the closeup photographing mode, the controller 180 designates the divisional sections DSs having an average depth value of the divisional sections DSs having the depth value indicating the middle distance and the divisional sections DSs having the depth value of the closeup object among a plurality of the divisional sections DSs set on the left and right eye images L and R as a convergence point and is then able to generate a 3D image by overlapping the divisional sections DSs of the left and right eye images L and R, which are designated to the convergence point, with each other.

For instance, referring to FIG. 12B, in case that the taken subject in the left and right eye images L and R is a person, the controller 180 designates the divisional sections DSs having an average depth value of the depth value of the divisional sections DSs set on 'person' situated nearest to the left and right eye cameras (i.e., the closeup object) and the depth value of the divisional sections DSs set on the subject configuring an indoor space or background to a convergence point and is then able to generate a 3D image by stacking the whole left eye image L and the whole right eye image R on each other in a manner that the divisional sections DSs of the left and right eye images L and R designated to the convergence point are overlapped with each other.

In case of the closeup photographing mode, since a photographer mostly intends to represent a 3D effect by emphasizing a closeup object, a divisional section DS of a unit subject situated farther than the closeup object is preferably designated to a convergence point.

Referring to FIG. 12C, when the 3D image generated in the closeup photographing mode shown in FIG. 12B is displayed on the display unit 151, the divisional section DS set as the convergence point of the 3D image is displayed on the surface of the display unit 151 (i.e., stereowindow) and an observer recognizes that the closeup object taken in the 3D image 3D is displayed by being projected in front of the surface of the display unit 151.

Thus, in case that a subject is a closeup object, the controller 180 sets a convergence point as mentioned in the foregoing description. Therefore, the realistic 3D effect of the 3D image is enhanced and the 3D image is also prevented from causing visual fatigue to an observer.

As mentioned in the foregoing description, the controller 180 sets up a plurality of divisional sections DSs on left and right eye images L and R and determines a depth value of each of a plurality of the divisional sections DSs. Subsequently, the controller 180 automatically designates an optimal convergence point suitable for a 3D image mode based on a distribution o the depth values of a plurality of the divisional sections DSs. Therefore, a photographer is able to photograph an optimal 3D image without causing visual fatigue to an observer.

Figure 13A:
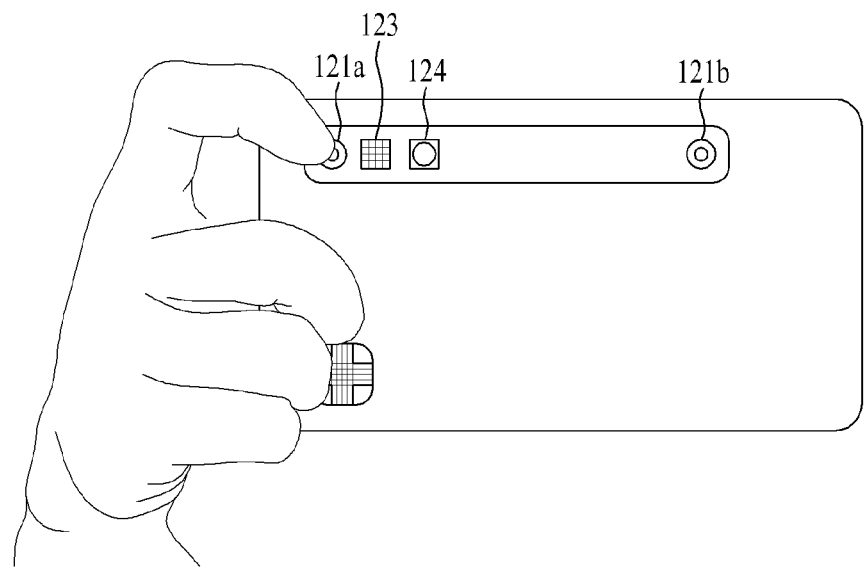
FIG. 13A is a rear view diagram of a mobile terminal if a non-matching section exists according to the present invention.
Figure 13B:
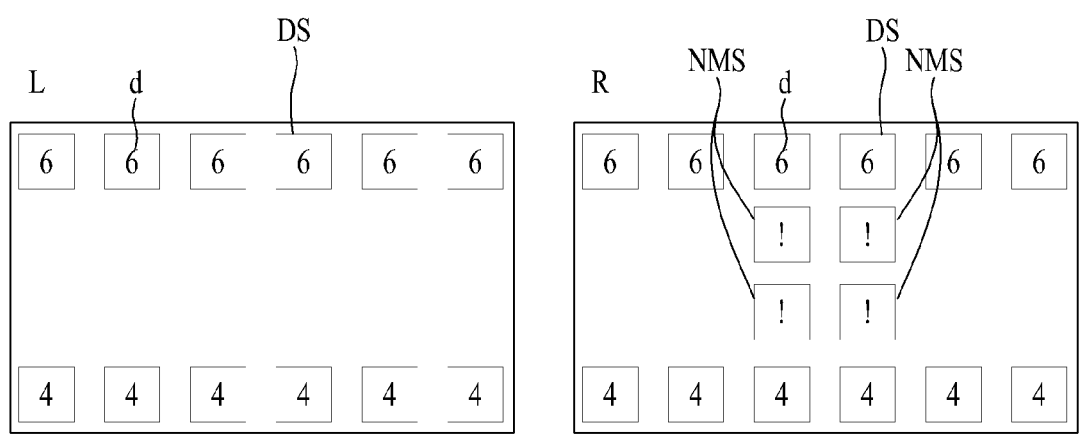
FIG. 13B is a schematic diagram of depth value distributions of divisional sections of left and right eye images in the mobile terminal shown in FIG. 13A.
Figure 13C:
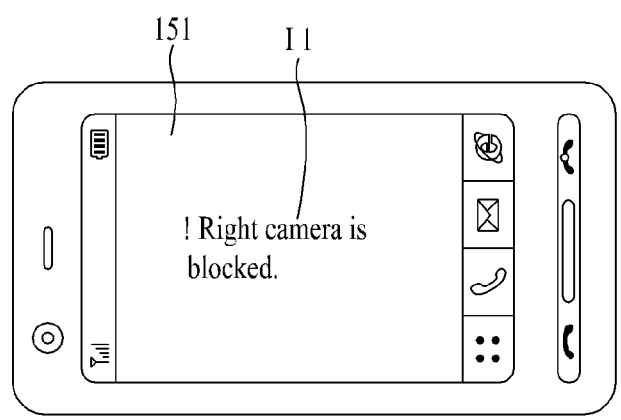
FIG. 13C is a schematic diagram of a display unit of the mobile terminal shown in FIG. 13A.

FIG. 13A is a rear view diagram of a mobile terminal if a non-matching section (NMS) exists according to the present invention. FIG. 13B is a schematic diagram of depth value distributions of divisional sections of left and right eye images in the mobile terminal shown in FIG. 13A. And, FIG. 13C is a schematic diagram of a display unit of the mobile terminal shown in FIG. 13A.

Referring to FIG. 13A, when a photographer photographs a 3D image using first and second cameras 121a and 121b of a mobile terminal, the photographer may unintentionally block at least one of the first and second cameras 121a and 121b with hand(s). In this case, if the photographing further proceeds, a 3D image having a reduced realistic 3D effect can be generated. Moreover, since the controller 180 is unable to designate a precise convergence point, a 3D image can be generated to cause visual fatigue.

In order to correct the above-mentioned mistake of a photographing posture of a photographer, the controller 180 of the present invention is able to control the display unit 151 to provide the photographer with information for correcting the photographer's photographing posture.

Referring to FIG. 13B, in case that an obstacle (e.g., photographer's hand) is situated in front of one of the first and second cameras 121a and 121b, the controller 180 determines a depth value of each of a plurality of divisional sections DSs set on left and right eye images L and R and is then able to determine that the obstacle is situated in front of either the first camera 121a or the second camera 121b. In particular, the controller 180 preferentially determines a depth value of each of a plurality of the divisional sections DSs set on the left and right eye images L and R and is then able to determine whether a non-matching section (NMS), which does not correspond to at least one reference section (RS) set on a plurality of the divisional sections DSs set on an FOV (field of view) of one of the left and right eye images L and R, exists in the other image over a preset rate.

In this case, the preset rate of the non-matching section (NMS) is a rate of a size of the non-matching section (NMS) over a total size of a plurality of the divisional sections DSs. Preferably, the preset rate ranges 20% to 30%.

If the controller 180 determines that the non-matching section (NMS) exists in the other image over the preset rate, the controller 180 is able to control the display unit 151 to provide the photographer with information on the non-matching section (NMS) or information for removing the non-matching section (NMS).

Referring to FIG. 13C, the information I1 on the non-matching section (NMS) provided to the display unit 151 is the information indicating that the obstacle exists in front of either the first camera 121a or the second camera 121b. For instance, the information I1 on the non-matching section (NMS) is the information on a substance 'Right camera is blocked.' or a similar substance. The information I1 for removing the non-matching section (NMS) provided to the display unit 151 is the information on a substance for guiding a user to remove the non-matching section (NMS) from a plurality of the divisional sections DSs set on the left and right eye images L and R. For instance, the information I1 for removing the non-matching section (NMS) is the information on a substance 'Remove obstacle (e.g., finger, etc.) in front of the right camera.' or a similar substance.

Therefore, the present invention provides information for correcting photographer's photographing posture, thereby preventing a 3D effect reduced 3D image or a 3D image causing visual fatigue from being generated due to a mistake made by the photographer.

Figure 14A:
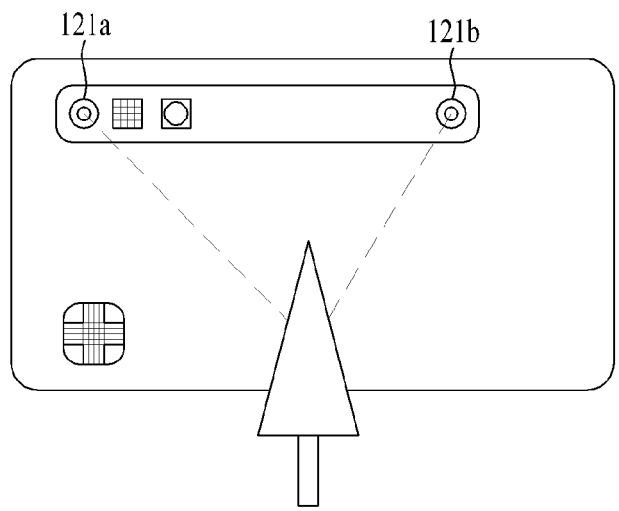
FIG. 14A is a rear view diagram of a mobile terminal if an indeterminate divisional section exists according to the present invention.
Figure 14B:
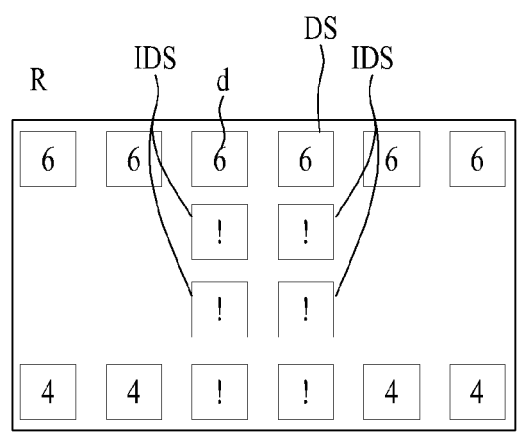
FIG. 14B is a schematic diagram of depth value distributions of divisional sections of a 3D image in the mobile terminal shown in FIG. 14A.
Figure 14C:
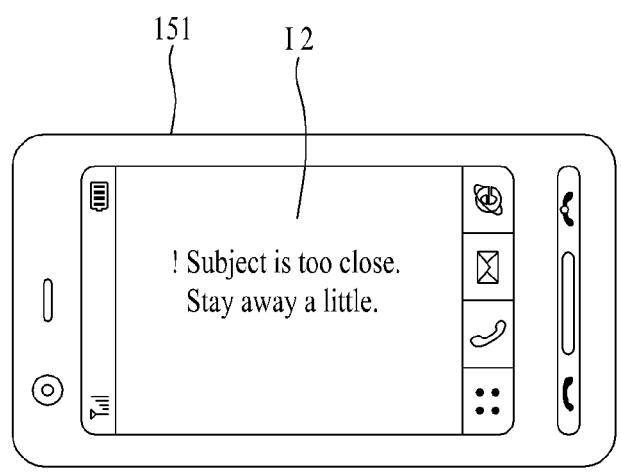
FIG. 14C is a schematic diagram of a display unit of the mobile terminal shown in FIG. 14A.

FIG. 14A is a rear view diagram of a mobile terminal if an indeterminate divisional section exists according to the present invention. FIG. 14B is a schematic diagram of depth value distributions of divisional sections of a 3D image in the mobile terminal shown in FIG. 14A. And, FIG. 14C is a schematic diagram of a display unit of the mobile terminal shown in FIG. 14A.

Referring to FIG. 14, as mentioned in the foregoing description, a binocular camera (i.e., first and second cameras 121a and 121b) for taking a 3D image is able to reproduce a 3D effect of a subject by taking a left eye image L and a right eye image R respectively. Yet, if a subject is situated within an angle of view for the first camera 121a (i.e., right eye camera) only, within an angle of view for the second camera 121b (i.e., left eye camera) only, or within a blind spot formed due to a spaced distance between the first and second cameras 121a and 121b, there exists a divisional section (hereinafter named an indeterminate divisional section: IDS) of which depth value can not be determined by the controller 180.

For instance, if a subject is situated within the blind spot of the first and second cameras 121a and 121b [FIG. 14A], the controller 180 is able to determine that an impossible section, of which depth value is not determinable, exists using an indeterminate division section (IDS) detecting means for detecting a subject within a blind spot [FIG. 14B]. Preferably, the subject detecting means is a device for detecting a subject within a blind spot based on a distance or range for a preset blind spot in consideration of an angle of view of the first camera 121a and an angle of view of the second camera 121b. And, the subject detecting means includes such a device as an infrared sensor, a proximity sensor, a distance sensor and the like.

If the controller 180 determines that the indeterminate divisional section IDS exists, the controller 180 is able to control the display unit 151 to display information on the indeterminate divisional section IDS or correction information for removing the indeterminate divisional section IDS.

For instance, referring to FIG. 14C, information I2 on the indeterminate divisional section IDS provided to the display unit 151 indicates a substance 'Subject is too close.' or a similar substance. And, information I2 for removing the indeterminate divisional section IDS is the information for guiding a user to be positioned within an overlapped angle of view (cf. FIG. 6) between the first and second cameras 121a and 121b and includes information on a substance 'Get away from the subject.' Or 'Stay away from the subject.' or a similar substance.

A mobile terminal according to the present invention provides information for correcting a photographing posture of a photographer to photograph an optimal 3D image, thereby enhancing a 3D effect of the photographer while reducing visual fatigue. And, the mobile terminal according to the present invention facilitates the photographer to photograph a 3D image.

In the following description, a method of controlling a mobile terminal according to the present invention is explained with reference to the accompanying drawings.

Figure 15:
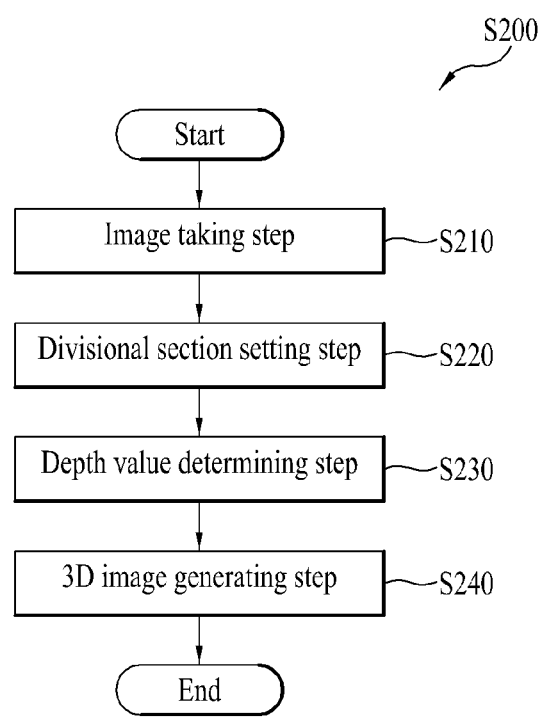
FIG. 15 is a schematic flowchart for a method of controlling a mobile terminal according to the present invention.

FIG. 15 is a schematic flowchart for a method of controlling a mobile terminal according to the present invention.

Referring to FIG. 15, a method S200 of controlling a mobile terminal according to the present invention includes an image taking step S210 of photographing a left eye image L and a right eye image R of a subject using a first camera 121a and a second camera 121b, respectively, a divisional section setting step S220 of arranging (or setting) a plurality of divisional sections DSs on each of the left and right eye images L and R of the subject obtained in the image taking step S210, a depth value determining step S230 of determining a depth value of each of a plurality of the divisional sections DSs, and a 3D image generating step S240 of synthesizing and processing a 3D image, from which observer's visual fatigue can be eliminated in case of viewing, based on the depth value of each of a plurality of the divisional sections DSs determined in the depth value determining step S230.

In particular, the photographer photographs the left eye image L and the right eye image R using the first camera 121a and the second camera 121b [S210].

Subsequently, the controller 180 sets a plurality of divisional sections DSs on each of the left and right eye images L and R respectively taken by the first and second cameras 121a and 121b [S220]. In this case, a plurality of the divisional sections DSs can be equal to each other in size or can be different from each other in size. In case that a plurality of the divisional sections DSs differ from each other in size, it is preferable that the size is determined per a plurality of unit subjects configuring a single subject.

The controller 180 determines depth values of a plurality of the divisional sections DSs set on each of the left and right eye images L and R [S230]. The depth value determining step S230 shall be explained in detail in the following description.

Thereafter, the controller 180 generates an optimal 3D image, of which realistic 3D effect is enhanced by preventing visual fatigue, in a manner of processing a synthesizing the left and right eye images L and R based on the depth value of each of a plurality of the divisional sections DSs [S240]. The 3D image generating step S240 shall be described in detail in the following description.

Figure 16:
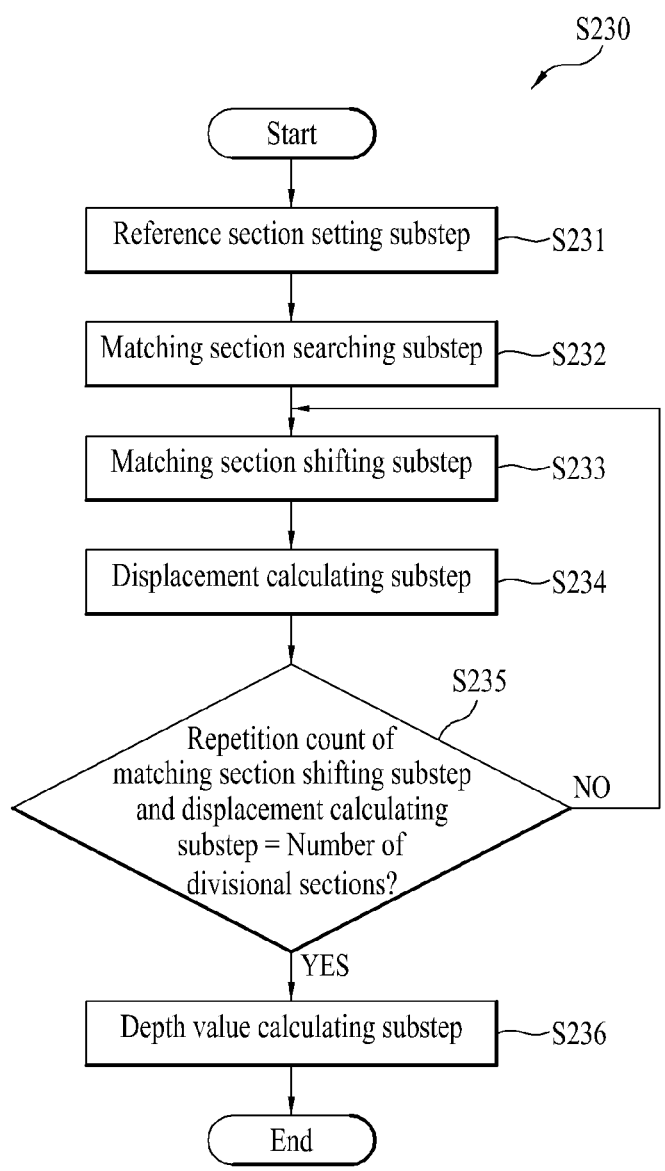
FIG. 16 is a schematic flowchart of a depth value determining step in a method of controlling a mobile terminal according to one embodiment of the present invention.

FIG. 16 is a schematic flowchart of the depth value determining step S230 in the method S200 of controlling a mobile terminal according to one embodiment of the present invention.

Referring to FIG. 16, the controller 180 executes the depth value determining step S230 of calculating the depth value for a plurality of the divisional sections DSs set in the divisional section setting step S220. In particular, the depth value determining step S230 includes a reference section setting substep S231, a matching section searching substep S232, a matching section (MS) shifting substep S233, a displacement calculating substep S234 and a depth value calculating substep S236. In the following description, the substeps of the depth value determining step S230 are explained in detail.

First of all, in order to determine a depth value, the controller 180 sets a plurality of divisional sections DSs set on an FOV (field of view) of one of the left eye image L and the right eye image R to at least one reference section RS [S231].

The controller 180 searches a plurality of the divisional sections DSs set in an FOV (field of view) of the other one of the left and right eye images L and R for at least one matching section MS corresponding to the at least one reference section RS determined in the reference section determining step S231 [S232]. In particular, the matching section searching substep S232 is executed with reference to whether a shape of the reference section RS is equal to that of the matching section MS, whether a chroma of the reference section RS is equal to that of the matching section MS, or whether a brightness of the reference section RS is equal to that of the matching section MS.

Subsequently, the controller 180 shifts the FOV (field of view) included in each of the at least one matching section MS within the other image to enable a position of each of the at least one reference section RS to match a position of each of the at least one matching section MS with reference to one image having the reference section RS set thereon [S233].

Thereafter, the controller 180 calculates a displacement of each of the at least one matching section MS within the other image in the matching section shifting step S233 [S234]. In particular, the displacement calculating method can refer to the former description with reference to FIG. 5.

In doing so, the controller 180 calculates the displacement of each of a plurality of the divisional sections DSs by repeating the matching section shifting substep S233 and the displacement calculating substep S234 as many times as the number of a plurality of the divisional sections DSs [S235].

Thereafter, the controller 180 calculates the depth value of each of the divisional sections DSs based on a plurality of the displacements calculated in the displacement calculating substep S234. In particular, the method of calculating the depth value of each of the divisional sections DSs based on a plurality of the displacements calculated in the displacement calculating substep S234 can refer to the former description with reference to FIG. 6.

Figure 17:
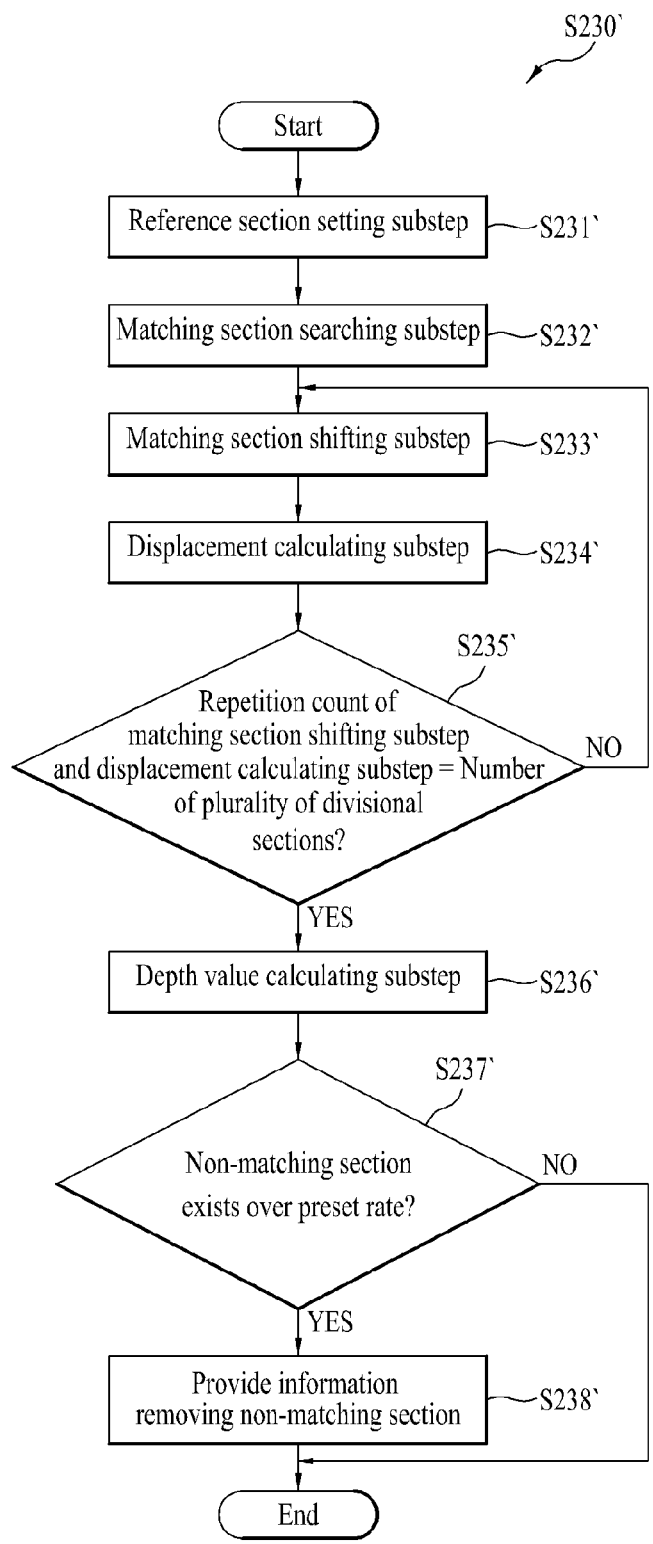
FIG. 17 is a schematic flowchart of a depth value determining step in a method of controlling a mobile terminal according to a first additional embodiment of the present invention.

FIG. 17 is a schematic flowchart of a depth value determining step S230' in a method of controlling a mobile terminal according to a first additional embodiment of the present invention.

Referring to FIG. 17, like the former depth value determining step S230 according to one embodiment, a depth value determining step S230' according to a first additional embodiment includes a reference section setting substep S231', a matching section searching substep S232', a matching section (MS) shifting substep S233', a displacement calculating substep S234' and a depth value calculating substep S236'. And, the depth value determining step S230' according to the first additional embodiment further includes an information providing substep S238' of correcting a photographing posture of a photographer.

In particular, after completion of the depth value calculating substep S236', the controller 180 determines whether a non-matching section (NMS), which does not correspond to at least one reference section (RS) set on a plurality of the divisional sections DSs set on an FOV (field of view) of one of the left and right eye images L and R, exists in the other image over a preset rate [S237'].

If the controller 180 determines that the non-matching section (NMS) exists in the other image over the preset rate, the controller 180 provides the photographer with information on the non-matching section NMS or information for removing the non-matching section (NMS) via the display unit 151 [S238'].

In this case, the preset rate of the non-matching section (NMS) is a rate of a size of the non-matching section (NMS) over a total size of a plurality of the divisional sections DSs. Preferably, the preset rate ranges 20% to 30%.

Figure 18:
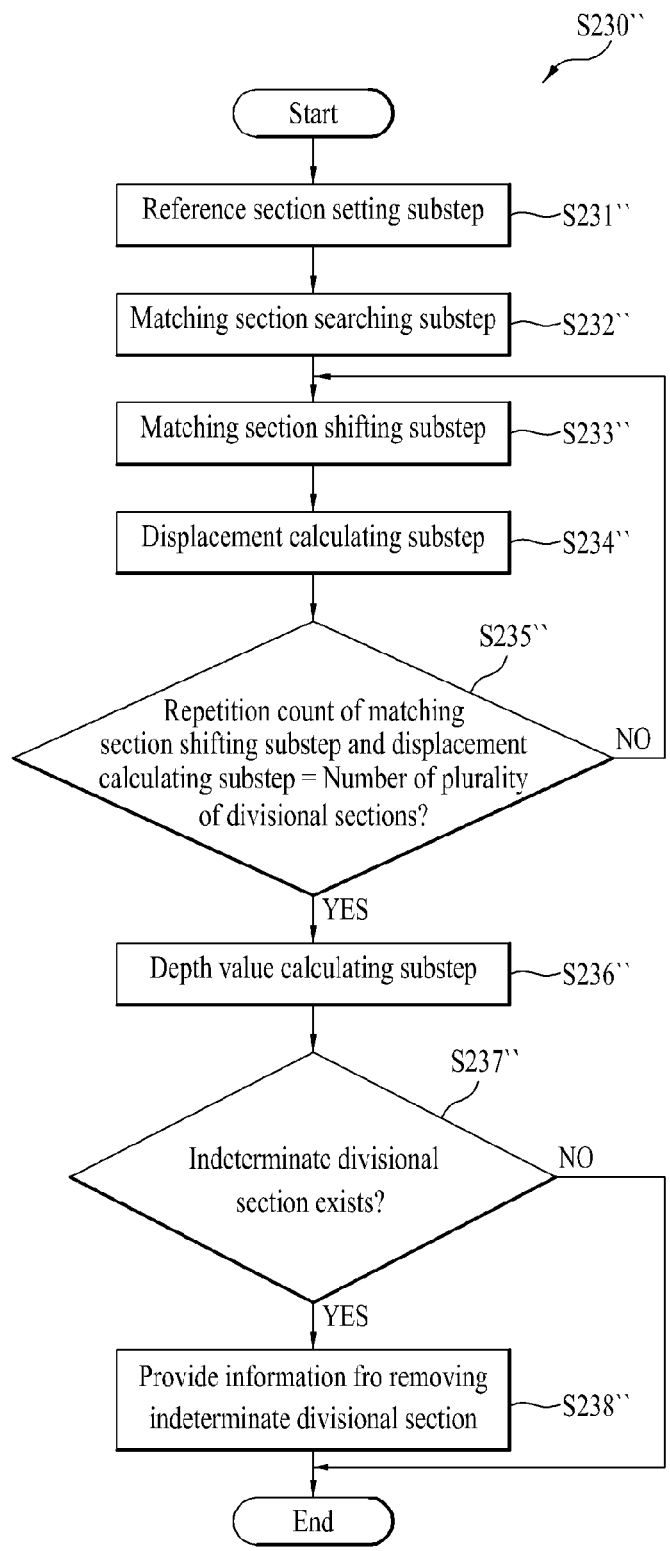
FIG. 18 is a schematic flowchart of a depth value determining step in a method of controlling a mobile terminal according to a second additional embodiment of the present invention.

FIG. 18 is a schematic flowchart of a depth value determining step in a method of controlling a mobile terminal according to a second additional embodiment of the present invention.

Referring to FIG. 18, like the former depth value determining step S230 according to one embodiment, a depth value determining step S230" according to a second additional embodiment includes a reference section setting substep S231", a matching section searching substep S232", a matching section (MS) shifting substep S233", a displacement calculating substep S234" and a depth value calculating substep S236". And, the depth value determining step S230" according to the second additional embodiment further includes a guide information providing substep S237" of guiding the photographer to photograph a 3D image with ease.

In particular, after completion of the depth value calculating substep S235", the controller 180 determines whether indeterminate divisional sections IDSs, of which depth values can not be determined, exist among a plurality of the divisional sections DSs [S236"].

If the controller 180 determines that the indeterminate divisional sections IDSs, of which depth values can not be determined, exist among a plurality of the divisional sections DSs, the controller provides the photographer with information on the indeterminate divisional section or information for removing the indeterminate divisional section IDS via the display unit [S237"].

Figure 19:
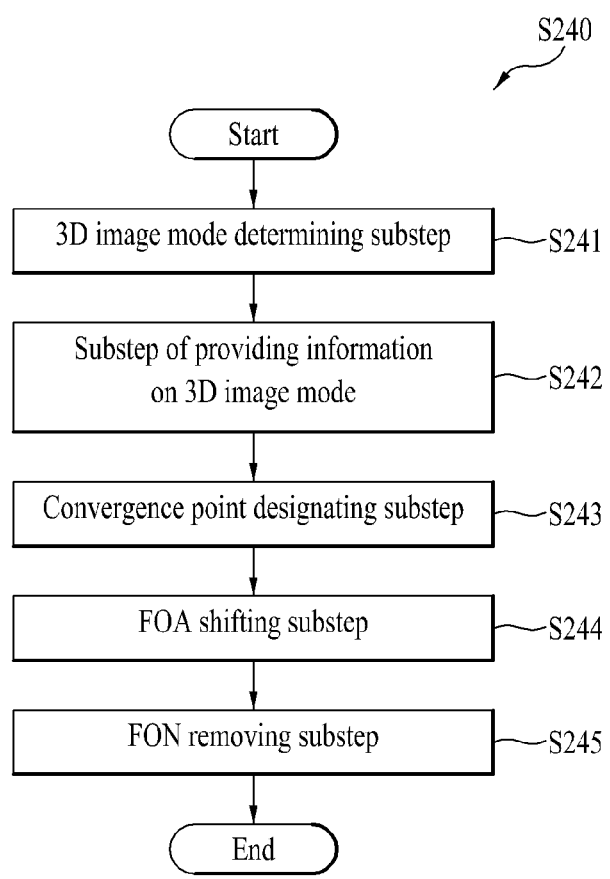
FIG. 19 is a schematic flowchart of a 3D image generating step in a method of controlling a mobile terminal according to the present invention.

FIG. 19 is a schematic flowchart of a 3D image generating step S240 in a method of controlling a mobile terminal according to the present invention.

Referring to FIG. 19, the 3D image generating step S240 according to the present invention includes a 3D image mode determining substep s241, a substep S242 of providing information on a 3D image mode, a convergence point designating substep S243, an FOV (field of view) shifting substep S244 and an FON (field of non-view) removing substep S245.

In particular, in order to generate a 3D image, the controller 180 preferentially determines a 3D image mode of the 3D image suitable for a subject based on the depth values of a plurality of the divisional sections DSs, which are determined in one of the depth value determining steps S230, S230' and S230" [S241].

In this case, the 3D image mode determined in the 3D image mode determining substep S241 includes one of a landscape mode having a unique preset depth value distribution, an intra-landscape focal object mode having a unique preset depth value distribution, an indoor focal object mode having a unique preset depth value distribution, and a closeup photographing mode having a unique preset depth value distribution. Yet, the determined 3D image mode is an exemplary 3D image mode for facilitating a photographer to photograph a 3D image of high quality in a manner of facilitating the photographer to designate a convergence point, by which the present invention is non-limited.

In the following description, the preset depth value distributions of the 3D image modes are explained.

First of all, a landscape mode has a preset depth value distribution [cf. FIG. 9]. In particular, a plurality of depth values indicating a remote distance are arranged on a top side of a 3D image frame, while a plurality of depth values indicating a middle distance are arranged on a bottom side of the 3D image frame.

Secondly, an intra-landscape focal object mode has a preset depth value distribution [cf. FIG. 10]. In particular, a plurality of depth values indicating a remote distance are arranged on a top side of a 3D image frame, a plurality of depth values indicating a near distance are arranged on at least one of a middle side and a bottom side of the 3D image frame, and a plurality of depth values indicating a middle distance are arranged on at least one part of the bottom side of the 3D image frame.

Thirdly, an indoor focal object mode has a preset depth value distribution [cf. FIG. 11]. In particular, a plurality of depth values indicating a middle distance are arranged on a top side of a 3D image frame, a plurality of depth values indicating a near distance are arranged on at least one of a middle side and a bottom side of the 3D image frame, and a plurality of depth values indicating a middle distance are arranged on at least one part of the bottom side of the 3D image frame.

Fourthly, a closeup photographing mode has a preset depth value distribution [cf. FIG. 12]. In particular, a plurality of depth values indicating a middle distance are arranged on a top side of a 3D image frame, a plurality of depth values indicating a closeup distance are arranged on at least one of a middle side and a bottom side of the 3D image frame, and a plurality of depth values indicating a middle distance are arranged on at least one part of the bottom side of the 3D image frame.

Preferably, if the controller 180 determines that a matching rate between the depth value distribution of a plurality of the divisional sections DSs and the above-mentioned preset depth value of the 3D image mode is equal to or greater than a preset synchronization rate, the controller 180 determines a mode of a 3D image of a subject as a 3D image mode corresponding to the synchronization rate of the depth value distribution. In this case, the preset synchronization rate is preferably set to 70%~80%.

Thus, the controller 180 determines whether the matching rate between the depth value distribution of a plurality of the divisional sections DSs and the above-mentioned preset depth value of the 3D image mode is equal to or greater than the preset synchronization rate. Although the matching rate between the depth value distribution of a plurality of the divisional sections DSs does not match the preset depth value of the 3D image mode, the controller 180 is able to generate the 3D image, of which realistic 3D effect is enhanced and of which visual fatigue is prevented, by correcting the mismatch between the depth value distributions.

Preferably, if the controller 180 determines that a matching rate between the depth value distribution of a plurality of the divisional sections DSs and the preset depth value of the 3D image mode is smaller than the preset synchronization rate, the controller 180 determines a mode of a 3D image of a subject as a landscape mode. When the 3D image generated in the landscape mode is watched, an observer recognizes that almost all of subjects are situated by receding in rear of the surface of the display unit 151, whereby visual fatigue is not caused to the observer. Therefore, if the controller 180 is unable to determine the 3D image mode of the subject, the controller 180 determines the 3D image mode, which does not cause the visual fatigue, as the landscape mode.

Preferably, after the controller 180 has determined the 3D image mode, the controller 180 provides the information on the 3D image mode determined in the 3D image mode determining substep to the photographer via the display unit [S242]. In particular, the controller informs a user of a type of the determined 3D image mode to enable the user to determine whether the determined 3D image mode is a 3D image mode desired by the photographer. In this case, the mobile terminal can further include a rest or refresh button for resetting the 3D image mode if the photographer determines that the 3D image mode determined by the controller 180 is not appropriate. If the reset or refresh button is selected, the controller 180 determines a most appropriate one of the rest of the 3D image modes except the determined 3D image mode as a mode of the 3D image.

After completion of the 3D image mode determining substep S241, the controller 180 sores at least one of a plurality of the divisional sections DSs as a convergence point based on the 3D image mode determined in the 3D image mode determining substep S241 [S243].

In particular, if the 3D image mode determined in the 3D image mode determining step S241 is the landscape mode, the controller 180 designates the divisional sections DSs having the depth value indicating the nearest distance among a plurality of the divisional sections DSs set on the left eye image L and the right eye image R to the convergence point [cf. FIG. 9]. In particular, if the 3D image mode determined in the 3D image mode determining step S241 is the intra-landscape focal object mode, the controller 180 designates the divisional sections DSs corresponding to an average depth value of the divisional sections DSs having the depth value indicating the nearest distance and the divisional sections DSs having a depth value of a focal object among a plurality of the divisional sections DSs set on the left eye image L and the right eye image R to the convergence point [cf. FIG. 10]. In particular, if the 3D image mode determined in the 3D image mode determining step S241 is the indoor focal object mode, the controller 180 designates the divisional sections DSs having a depth value of a focal object among a plurality of the divisional sections DSs set on the left eye image L and the right eye image R to the convergence point [cf. FIG. 1109]. In particular, if the 3D image mode determined in the 3D image mode determining step S241 is the closeup photographing mode, the controller 180 designates the divisional sections DSs having an average depth value of the divisional sections DSs having the depth value indicating the middle distance and the divisional sections DSs having a depth value of a closeup object among a plurality of the divisional sections DSs set on the left eye image L and the right eye image R to the convergence point [cf. FIG. 12].

Preferably, if a unit subject is situated at the divisional sections DSs set on an edge of a 3D image frame, the controller 180 designates the divisional sections DSs set on the edge of the 3D image frame among a plurality of the divisional sections DSs to the convergence point or designates the divisional sections DSs having a depth value indicating a distance farther than the depth value of the divisional sections DSs set on the edge of the 3D image frame to the convergence point. When a 3D image is watched, if a subject is situated by getting closer to the edge of the display unit 151, it is difficult for an observer to obtain a big parallax. Hence, it is not easy to provide a 3D effect. Despite a range capable of providing a 3D effect, if an observer recognizes that the subject is situated in a manner of being projected from the edge of the display unit 151, it causes an unrealistic 3D effect and visual fatigue to the observer. Therefore, as mentioned in the foregoing description, if a unit subject exists on the edge of the 3D image frame, it is able to solve the above-mentioned problems in a manner that the controller 180 corrects the convergence point into the 3D image frame part.

After completion of the convergence point designating substep S243, the controller 180 shifts an FOV (field of view) of at least one of the left eye image L and the right eye image R within the left eye image L and the right eye image R in a manner that the FOVs of the left eye image L and the right eye image R included in the at least one divisional section DS designated to the convergence point in the convergence point designating substep S243 are overlapped with each other [S244].

Subsequently, the controller 180 synthesizes a 3D image in a manner of overlapping the left eye image L and the right eye image R together at the position shifted by the FOV shifting substep S244.

Thereafter, the controller 180 removes a region except the preset 3D image frame or the FON (field of non-view) from the 3D image synthesized in the 3D image synthesizing step [S245]. Optionally, the region removing substep S245 can be executed before the FOV shifting substep S244.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a first camera and a second camera configured to respectively obtain a left eye image and a right eye image of a scene;
    a display configured to display a three-dimensional (3D) image;
    a memory configured to store preset 3D image modes, wherein each mode of the preset 3D image modes has a unique preset depth value distribution of divisional sections, and at least one of the divisional sections is designated as a preset convergence point; and
    a controller controlling the first camera, the second camera, the memory, and the display,
    wherein the controller is configured to:
        set a plurality of divisional sections for each of the left eye image and the right eye image;
        determine a depth value distribution of each of the plurality of divisional sections;
        select a 3D image mode among the preset 3D image modes stored in the memory by comparing the determined depth value distribution with the preset depth value distribution, the preset depth value distribution of the selected 3D image mode corresponding to the determined depth value distribution;
        designate at least one of the plurality of divisional sections as a convergence point based on the preset convergence point of the selected 3D image mode;
        shift a view field of at least one image within the left and right eye images such that view fields of the left and right eye images included in the at least one of the plurality of divisional sections designated as the convergence point overlaps with each other;
        generate the 3D image by overlapping the left eye image and the right eye image with each other; and
        cause the display to display the generated 3D image.

2. The mobile terminal of claim 1, wherein:
    each of the plurality of divisional sections for each of the left eye image and the right eye image has the same size; or
    at least one of the plurality of divisional sections has a different size.

3. The mobile terminal of claim 2, wherein the controller is further configured to set the plurality of divisional sections for each of the left eye image and the right eye image with reference to a unit subject included in the left eye image and the right eye image when the at least one of the plurality of divisional sections has the different size.

4. The mobile terminal of claim 1, wherein the controller is further configured to:
    set the plurality of divisional sections on a view field of one image of the left eye image and the right eye image as at least one reference section; and
    search at least one matching section corresponding to the at least one reference section in the plurality of divisional sections set on a view field of the other image of the left eye image and the right eye image.

5. The mobile terminal of claim 4, wherein the controller is further configured to:
    shift the view field included in each of the at least one matching section within the other image such that a position of each of the at least one reference section is matched with a position of each of the at least one matching section with reference to the one image;
    calculate a displacement of each of the at least one matching section shifted within the other image; and
    determine the depth value of each of the plurality of divisional sections based on the calculated displacement.

6. The mobile terminal of claim 1, wherein the preset 3D image modes stored in the memory comprise at least one of:
    a landscape mode having a unique preset depth value distribution;
    an intra-landscape focal object mode having a unique preset depth value distribution;
    an indoor focal object mode having a unique preset depth value distribution; or a close-up photographing mode having a unique preset depth value distribution.

7. The mobile terminal of claim 6, wherein the landscape mode has the preset depth value distribution configured in a manner of arranging a plurality of depth values indicating a remote distance on a top portion of a 3D image frame and arranging a plurality of depth values indicating a middle distance on a bottom portion of the 3D image frame.

8. The mobile terminal of claim 6, wherein the intra-landscape focal object mode has the preset depth value distribution configured in a manner of arranging a plurality of depth values indicating a remote distance on a top portion of a 3D image frame, arranging a plurality of depth values indicating a near distance on at least a middle portion or a bottom portion of the 3D image frame, and arranging a plurality of depth values indicating a middle distance on at least the bottom portion of the 3D image frame.

9. The mobile terminal of claim 6, wherein the indoor focal object mode has the preset depth value distribution configured in a manner of arranging some of a plurality of depth values indicating a middle distance on a top portion of a 3D image frame, arranging a plurality of depth values indicating a near distance on at least a middle portion or a bottom portion of the 3D image frame, and arranging the rest of the plurality of depth values indicating the middle distance on at least the bottom portion of the 3D image frame.

10. The mobile terminal of claim 6, wherein the close-up photographing mode has the preset depth value distribution configured in a manner of arranging a plurality of depth values indicating a middle distance on at least a top portion or a bottom portion of a 3D image frame, and arranging a plurality of depth values indicating a close-up distance on at least a middle portion of the 3D image frame.

11. The mobile terminal of claim 6, wherein:
if a matching rate between the depth value distribution of the plurality of divisional sections and the preset depth value distribution of the 3D image mode is equal to or greater than a preset synchronization rate, the controller is further configured to determine a mode of the 3D image as the 3D image mode corresponding to the preset synchronization rate of the depth value distribution, and
if the matching rate between the depth value distribution of the plurality of divisional sections and the preset depth value distribution of the 3D image mode is less than the preset synchronization rate, the controller is further configured to determine the mode of the 3D image as the landscape mode.

12. The mobile terminal of claim 11, wherein the preset synchronization rate comprises 70% to 80%.

13. The mobile terminal of claim 6, wherein if the 3D image mode selected by the controller is the landscape mode, the controller is further configured to designate a divisional section having a depth value indicating a nearest distance among the plurality of divisional sections set on the left eye image and the right eye image as the convergence point.

14. The mobile terminal of claim 6, wherein if the 3D image mode selected by the controller is the intra-landscape focal object mode, the controller is further configured to designate a divisional section corresponding to an average depth value between a divisional section having a depth value indicating a nearest distance and a divisional section having a depth value of a focal object among the plurality of divisional sections set on the left eye image and the right eye image as the convergence point.

15. The mobile terminal of claim 6, wherein if the 3D image mode selected by the controller is the indoor focal object mode, the controller is further configured to designate a divisional section having a depth value of a focal object among the plurality of divisional sections set on the left eye image and the right eye image as the convergence point.

16. The mobile terminal of claim 6, wherein if the 3D image mode selected by the controller is the close-up photographing mode, the controller is further configured to designate a divisional section having an average depth value between a divisional section having a depth value indicating a middle distance and a divisional section having a depth value of a close-up object among the plurality of divisional sections set on the left eye image and the right eye image as the convergence point.

17. The mobile terminal of claim 1, wherein if a unit subject is situated at divisional sections set on an edge portion of a 3D image frame, the controller is further configured to:
designate the divisional sections set on the edge portion of the 3D image frame as the convergence point; or
designate divisional sections having a depth value indicating a distance that is farther than a depth value of the divisional sections set on the edge portion of the 3D image frame as the convergence point.

* * * * *